US010665108B2

(12) United States Patent
Hagawa et al.

(10) Patent No.: US 10,665,108 B2
(45) Date of Patent: May 26, 2020

(54) INFORMATION PROCESSING APPARATUS AND NON-TRANSITORY COMPUTER-READABLE RECORDING MEDIUM

(71) Applicant: Panasonic Intellectual Property Corporation of America, Torrance, CA (US)

(72) Inventors: Reiko Hagawa, Tokyo (JP); Yasunori Ishii, Osaka (JP)

(73) Assignee: PANASONIC INTELLECTUAL PROPERTY CORPORATION OF AMERICA, Torrance, CA (US)

(\*) Notice: Subject to any disclaimer, the term of this patent is extended or adjusted under 35 U.S.C. 154(b) by 192 days.

(21) Appl. No.: 15/897,044

(22) Filed: Feb. 14, 2018

(65) Prior Publication Data

US 2018/0247540 A1  Aug. 30, 2018

(30) Foreign Application Priority Data

Feb. 27, 2017 (JP) ................................ 2017-034712
Oct. 26, 2017 (JP) ................................ 2017-206860

(51) Int. Cl.
*G08G 1/16* (2006.01)
*B60W 30/16* (2020.01)
(Continued)

(52) U.S. Cl.
CPC ............. *G08G 1/167* (2013.01); *B60K 31/00* (2013.01); *B60K 31/0008* (2013.01);
(Continued)

(58) Field of Classification Search
CPC ........ G08G 1/167; G08G 1/166; B60W 30/16
See application file for complete search history.

(56) References Cited

U.S. PATENT DOCUMENTS

2016/0221604 A1\* 8/2016 Yamaoka ............. B62D 15/025
2017/0080952 A1\* 3/2017 Gupta .................... B60K 35/00
(Continued)

FOREIGN PATENT DOCUMENTS

JP  2011-108016  6/2011

*Primary Examiner* — Anne Marie Antonucci
*Assistant Examiner* — Abdalla A Khaled
(74) *Attorney, Agent, or Firm* — Greenblum & Bernstein, P.L.C.

(57) ABSTRACT

An information processing apparatus mounted on a first vehicle includes a recognizer that recognizes a second vehicle that is present in a travelling direction of the first vehicle on a basis of sensing information obtained from a sensor attached to an outside of the first vehicle, and a determiner that determines whether or not control for overtaking the recognized second vehicle is executed. The apparatus also includes a generator that generates first information for moving the first vehicle in a second direction toward a second road end in a case where the determiner determines that the control for overtaking is executed, the second road end being opposite to a first road end toward which a first direction is directed, and the first direction being a direction in which the first vehicle moves in order to overtake the second vehicle. The apparatus further includes an outputter that outputs the generated first information.

18 Claims, 16 Drawing Sheets

(51) Int. Cl.
*B60W 30/18* (2012.01)
*B60W 50/14* (2020.01)
*B60W 30/09* (2012.01)
*B60K 31/00* (2006.01)
*B60W 30/095* (2012.01)
*B60W 10/20* (2006.01)
*B60W 10/18* (2012.01)

(52) U.S. Cl.
CPC .......... *B60W 30/09* (2013.01); *B60W 30/095* (2013.01); *B60W 30/16* (2013.01); *B60W 30/18* (2013.01); *B60W 30/18163* (2013.01); *B60W 50/14* (2013.01); *G08G 1/166* (2013.01); *B60W 10/18* (2013.01); *B60W 10/20* (2013.01); *B60W 2420/42* (2013.01); *B60W 2554/00* (2020.02)

(56) References Cited

U.S. PATENT DOCUMENTS

2017/0096106 A1\* 4/2017 Higuchi .................... B60R 1/00
2017/0113686 A1\* 4/2017 Horita .................... B60W 30/12
2019/0143972 A1\* 5/2019 Ishioka .................. G08G 1/167
                                                                701/70

\* cited by examiner

INFORMATION PROCESSING APPARATUS AND NON-TRANSITORY COMPUTER-READABLE RECORDING MEDIUM

BACKGROUND

1. Technical Field

The present disclosure relates to an information processing apparatus mounted on a vehicle and a non-transitory computer-readable recording medium.

2. Description of the Related Art

A driver of a vehicle following a large-sized vehicle such as a bus has troubles grasping a situation ahead of the large-sized vehicle that is stopped since the large-sized vehicle blocks view of the driver ahead of the vehicle. In a case where the large-sized vehicle has stopped and a pedestrian is passing a road ahead of the large-sized vehicle, the driver of the vehicle following the large-sized vehicle overtakes the large-sized vehicle without seeing the pedestrian. This leads to a risk of collision between the vehicle following the large-sized vehicle and the pedestrian.

For example, Japanese Unexamined Patent Application Publication No. 2011-108016 proposes a travelling support apparatus that detects a travelling region where a blind area of a vehicle is reduced and causing the vehicle to travel in the travelling region. Specifically, the vehicle is moved laterally with respect to a travelling direction by an allowable amount from an object that blinds the vehicle. According to Japanese Unexamined Patent Application Publication No. 2011-108016, this can reduce a blind area of the vehicle.

SUMMARY

In one general aspect, the techniques disclosed here feature an information processing apparatus mounted on a first vehicle including: a recognizer that recognizes a second vehicle that is present in a travelling direction of the first vehicle on a basis of sensing information obtained from a sensor attached to an outside of the first vehicle; a determiner that determines whether or not control for overtaking the recognized second vehicle is executed; a generator that generates first information for moving the first vehicle in a second direction toward a second road end in a case where the determiner determines that the control for overtaking is executed, the second road end being opposite to a first road end toward which a first direction is directed, and the first direction being a direction in which the first vehicle moves in order to overtake the second vehicle; and an outputter that outputs the generated first information.

According to the present disclosure, it is possible to provide an information processing apparatus that makes it possible to more safely overtake a vehicle and a non-transitory computer-readable recording medium storing a program for causing the information processing apparatus to operate.

It should be noted that general or specific embodiments may be implemented as a system, a method, an integrated circuit, a computer program, a computer-readable recording medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
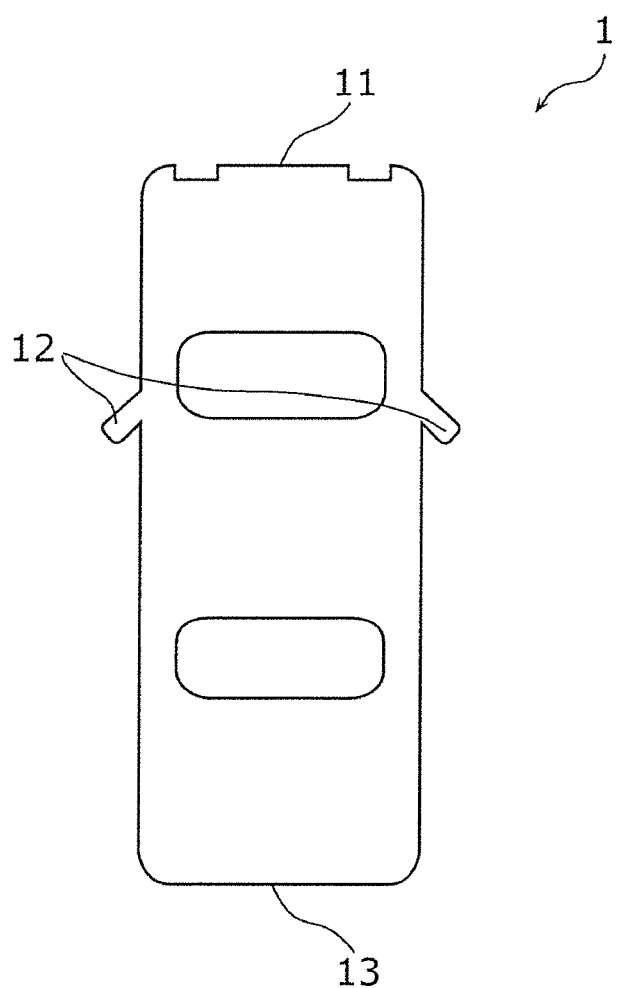
FIG. 1 illustrates an example of a sensing function mounted on a host vehicle according to Embodiment 1.

Underlying Knowledge Forming Basis of the Present Disclosure

According to the technique described in Japanese Unexamined Patent Application Publication No. 2011-108016, it is sometimes difficult to safely overtake a vehicle. For example, according to the apparatus disclosed in Japanese Unexamined Patent Application Publication No. 2011-108016, a pedestrian in a blind area enters a field of view of a vehicle that tries to overtake earlier than before, but the vehicle who tries to overtake takes an avoidance action after finding the pedestrian and therefore sometimes does not have enough time to avoid the pedestrian. This leads to a risk of collision between the overtaking vehicle and the pedestrian.

The present disclosure was accomplished in view of the above circumstances, and the present disclosure provides an information processing apparatus that allows a vehicle to more safely overtake a vehicle and a non-transitory computer-readable recording medium storing a program for causing the information processing apparatus to operate.

An information processing apparatus according to an aspect of the present disclosure is an information processing apparatus mounted on a first vehicle and includes: a recognizer that recognizes a second vehicle that is present in a travelling direction of the first vehicle on a basis of sensing information obtained from a sensor attached to an outside of the first vehicle; a determiner that determines whether or not control for overtaking the recognized second vehicle is executed; a generator that generates first information for moving the first vehicle in a second direction toward a second road end in a case where the determiner determines that the control for overtaking is executed, the second road end being opposite to a first road end toward which a first direction is directed, and the first direction being a direction in which the first vehicle moves in order to overtake the second vehicle; and an outputter that outputs the generated first information.

According to this configuration, the first vehicle that is a following vehicle can check whether or not a moving object such as a pedestrian is present ahead of the second vehicle which the first vehicle is trying to overtake before passing beside the second vehicle in order to overtake the second vehicle and can therefore more safely overtake the vehicle.

The information processing apparatus may be, for example, configured such that the determiner further performs a first continuation determining process for determining whether or not execution of the control for overtaking is continued on a basis of sensing information obtained after movement of the first vehicle in the second direction; the generator generates second information for overtaking the second vehicle in a case where the determiner determines in the first continuation determining process that execution of the control for overtaking is continued; and the outputter outputs the generated second information. This makes it possible to cancel overtaking before overtaking on the basis of a moving object that is present ahead of the second vehicle which the first vehicle is trying to overtake, thereby further improving safety.

The information processing apparatus may be, for example, configured such that the recognizer further recognizes a person that is present in the travelling direction on a basis of the sensing information obtained after the movement; and the determiner performs the first continuation determining process on a basis of a positional relationship between the person recognized by the recognizer and the second vehicle. This makes it possible to determine a possibility of rush-out of the person onto an overtaking lane on the basis of the positional relationship. It is therefore possible to achieve both safety and travelling efficiency during overtaking.

The information processing apparatus may be, for example, configured such that the recognizer further recognizes behavior or a state of the recognized person; and the determiner further performs the first continuation determining process on a basis of the behavior or the state of the person recognized by the recognizer. This makes it possible to more accurately determine a possibility of rush-out of the person onto the overtaking lane.

The information processing apparatus may be, for example, configured such that the generator determines how the first vehicle behaves when overtaking the second vehicle in accordance with the behavior or the state of the person recognized by the recognizer in a case where the determiner determines in the first continuation determining process that the control for overtaking is continued, and generates the second information for overtaking the second vehicle on a basis of the determined behavior of the first vehicle. This makes it possible to determine the way of overtaking in accordance with the behavior or the state of the person. It is therefore possible to achieve both safety and travelling efficiency during overtaking.

The information processing apparatus may be, for example, configured such that the behavior of the first vehicle includes a vehicle speed or a travelling route. This makes it possible to determine a degree to which the first vehicle slowly moves or makes a detour during overtaking in accordance with the behavior or the state of the person.

The information processing apparatus may be, for example, configured such that the determiner further determines presence or absence of an oncoming vehicle in the travelling direction on a basis of sensing information obtained after output of the second information by the outputter and performs a second continuation determining process for determining whether or not execution of the control for overtaking is continued in accordance with a result of the determination as to the presence or absence of the oncoming vehicle. This allows the first vehicle to overtake the second vehicle by considering not only rush-out of a moving object, but also the presence or absence of an oncoming vehicle. This can further improve safety during overtaking.

The information processing apparatus may be, for example, configured such that the sensing information includes information obtained by imaging using a camera; and the recognizer further switches a provider of the sensing information from a front-view camera that is capable of imaging the travelling direction to a side-view camera that is capable of imaging a direction that crosses the travelling direction after output of the first information and recognizes a person present in the travelling direction on a basis of the sensing information that is an image obtained by the side-view camera. This makes it possible to recognize a person present around the second vehicle with more certainty.

The information processing apparatus may be, for example, configured such that the side-view camera is a fish-eye camera. This makes it possible to expand a recognition range as compared with a typical camera.

The information processing apparatus may be, for example, configured such that the recognizer further recognizes a moving object in the second direction on a basis of the sensing information; the determiner further determines whether or not the moving object has been recognized by the recognizer in a case where the determiner determines that the control for overtaking is executed; and the generator generates the first information in a case where the moving object has not been recognized. This makes it possible to avoid contact or collision with a moving object present in the second direction when the first vehicle moves in the second direction.

The information processing apparatus may be, for example, configured to further include a presentation controller that controls presentation of a result of the determination made by the determiner. This makes it possible to notify a person on the first vehicle of movement in the second direction beforehand.

The information processing apparatus may be, for example, configured such that the determiner determines whether or not the control for overtaking is executed on a basis of map information and positional information of the first vehicle or the second vehicle. This makes it possible to execute control for overtaking in a situation where a person rushes out from a front of the second vehicle, thereby reducing a processing load.

The information processing apparatus may be, for example, configured such that the first information and the second information include vehicle control information for controlling travelling of the first vehicle. This makes it possible to autonomously execute the control for overtaking in a case where the first vehicle is an autonomous vehicle.

The information processing apparatus may be, for example, configured such that the first information and the second information include information presented to a driver of the first vehicle. This makes it possible to call attention of a driver of the first vehicle in a case where the first vehicle is a manually-operated vehicle.

The information processing apparatus may be, for example, configured such that the first direction is a direction toward a right road end when viewed on a basis of the travelling direction of the first vehicle; and the second direction is a direction toward a left road end when viewed on a basis of the travelling direction of the first vehicle. This makes it possible to execute the control for overtaking in a place where a traffic rule is left-hand traffic.

The information processing apparatus may be, for example, configured such that the first direction is a direction toward a left road end when viewed on a basis of the travelling direction of the first vehicle; and the second direction is a direction toward a right road end when viewed on a basis of the travelling direction of the first vehicle. This makes it possible to execute the control for overtaking in a place where a traffic rule is right-hand traffic.

The information processing apparatus may be, for example, configured to further include an acquirer that acquires a traffic rule in a place where the first vehicle is travelling, wherein the generator determines the first direction and the second direction on a basis of the acquired traffic rule. This makes it possible to execute the control for overtaking in any of a plurality of places having different traffic rules.

Embodiments of the present disclosure are described below with reference to the drawings.

Each of the embodiments described below illustrates a specific example of the present disclosure. Numerical values, shapes, constituent elements, steps, order of steps, and the like in the embodiments below are examples and do not limit the present disclosure. Among constituent elements described in the embodiments below, constituent elements that are not recited in an independent claim showing a highest concept are described as optional constituent elements. Contents in all of the embodiments may be combined.

Embodiment 1

An information processing apparatus 10 according to Embodiment 1 is described below.
Vehicle 1

FIG. 1 illustrates an example of sensing devices corresponding to sensors mounted on a vehicle 1 according to Embodiment 1.

The vehicle 1 is an example of a first vehicle and is a vehicle such as an automobile. The information processing apparatus 10 according to Embodiment 1 is mounted on the vehicle 1.

The vehicle 1 illustrated in FIG. 1 includes, for example, a front camera 11, side cameras 12, and a rear camera 13 as sensing devices.

The front camera 11 is a front-view camera that is capable of imaging a travelling direction of the vehicle 1. The front camera 11 is, for example, a camera having an angle of view of 60 degrees or more, and the front camera 11 is provided on a front bumper of the vehicle 1 or around the front bumper and outputs, as sensing information, an image obtained by imaging a predetermined region in the travelling direction of the vehicle 1 (hereinafter also referred to as "ahead of the vehicle 1"). The rear camera 13 is, for example, a camera having an angle of view of 60 degrees or more, and the rear camera 13 is provided on a rear bumper or around the rear bumper and outputs, as sensing information, an image obtained by imaging a predetermined region in a direction opposite to the travelling direction of the vehicle 1 (hereinafter also referred to as "behind the vehicle 1"). That is, the sensing information includes information obtained by imaging using a camera.

The sensing devices are not limited to cameras, provided that the sensing devices can sense moving objects such as another vehicle and a pedestrian around the vehicle 1. For example, a radar may be mounted instead of the front camera 11 and the rear camera 13. In a case where a radar is mounted, the radar outputs, as sensing information, a result of measurement of a distance and a direction of the moving object to be measured ahead of or behind the vehicle 1.

The side cameras 12 are side-view cameras that are capable of imaging a direction that crosses the travelling direction of the vehicle 1. The side cameras 12 are, for example, fish-eye cameras having an angle of view of 180 degrees or more, and each of the side cameras 12 is provided on a side mirror of the vehicle 1 or around the side mirror and images a region beside, ahead of, and behind the vehicle 1. The side cameras 12 may be, for example, cameras having an angle of view of 60 degrees or more. In this case, the side cameras 12 need just be provided on a side mirror of the vehicle 1 so as to be directed toward the travelling direction and image a region beside and ahead of the vehicle 1.
Information Processing Apparatus 10

Next, a configuration of the information processing apparatus 10 is described.

Figure 2:
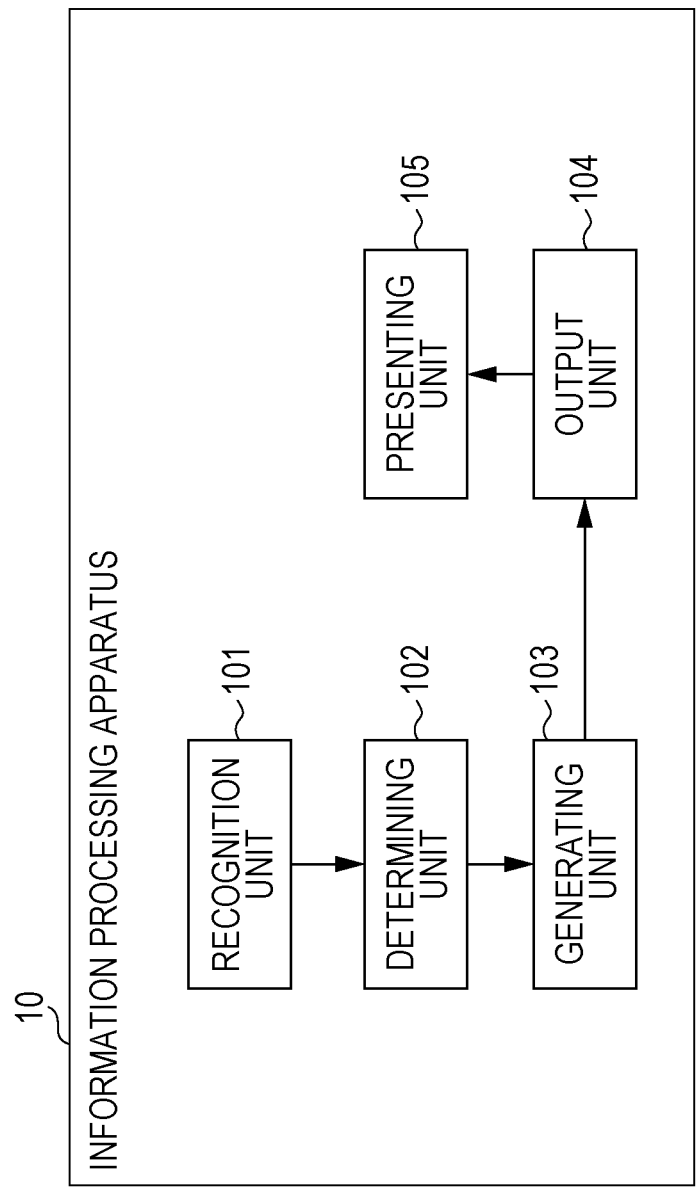
FIG. 2 illustrates an example of a configuration of an information processing apparatus according to Embodiment 1.

FIG. 2 illustrates an example of a configuration of the information processing apparatus 10 according to Embodiment 1.

The information processing apparatus 10 is mounted on the vehicle 1 and includes a recognition unit 101, a determining unit 102, a generating unit 103, an output unit 104, and a presenting unit 105, as illustrated in FIG. 2. Note that the information processing apparatus 10 may be configured not to include the presenting unit 105.
Recognition Unit 101

The recognition unit 101 recognizes a vehicle 30 that is present in the travelling direction of the vehicle 1 on the basis of sensing information. The sensing information is obtained from a sensor attached to the first vehicle. For example, the sensing information is information acquired by a sensing function mounted on the vehicle 1 and is used to measure or determine whether or not an object is present in the travelling direction of the vehicle 1.

Figure 3:
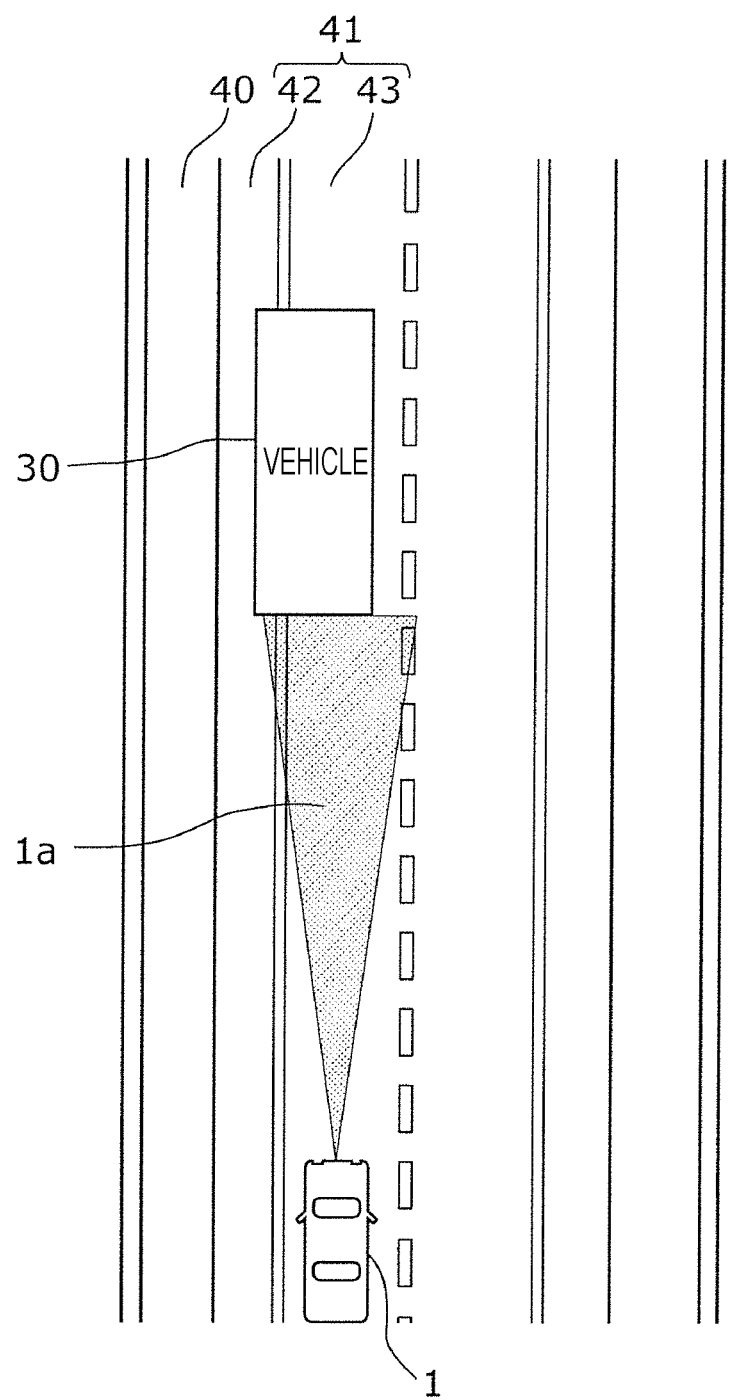
FIG. 3 illustrates sensing ahead of a host vehicle according to Embodiment 1.

Hereinafter, assume that drivers keep to the left side of a road. FIG. 3 illustrates sensing ahead of the vehicle 1 according to the present embodiment. FIG. 3 illustrates an example of a road 41 flanked by a sidewalk 40. The road 41 includes a driving lane 43 on which vehicles such as an automobile and a motorcycle can pass and a road shoulder 42 separated from the driving lane 43 by a white line. The vehicle 30 illustrated in FIG. 3 is an example of a second vehicle and is, for example, a bus. The vehicle 30 may be an automobile, a truck, or a streetcar such as a trolley car. Although drivers keep to the left on the road 41 illustrated in FIG. 3, drivers may keep to the right. In this case, the vehicle 1 and the vehicle 30 illustrated in FIG. 3 are positioned on an opposite side (right side) with respect to a central line of the road 41.

In the present embodiment, the recognition unit 101 recognizes the vehicle 30 that is present in the travelling direction of the vehicle 1 on the basis of sensing information and calculates a distance between the vehicle 30 and the vehicle 1. In the example illustrated in FIG. 3, the sensing information is, for example, an image obtained by imaging a region 1a ahead of the vehicle 1 with the use of the front camera 11. The recognition unit 101 can determine whether or not the vehicle 30 is present and calculate a distance between the vehicle 1 and the vehicle 30 by using the sensing information. Examples of a method for calculating a distance from an image include homography and Structure From Motion. The recognition unit 101 can calculate a distance between the vehicle 1 and the vehicle 30 on the basis of a position of the vehicle 30 in the image as long as an optical configuration of the front camera 11 and a size of the target vehicle are known.

The recognition unit 101 may recognize that the vehicle 30 is stopped or is about to stop on the basis of the sensing information. For example, in a case where the sensing information is an image, the recognition unit 101 can recognize that the vehicle 30 is stopped or is about to stop by detecting whether or not a brake light of the vehicle 30 is on in the image. Alternatively, the recognition unit 101 may recognize that the vehicle 30 is stopped or is about to stop on the basis of the sensing information and map information indicative of a road situation in the travelling direction. The map information is, for example, positional information (GPS information) of a bus stop and information indicating whether or not a road is curved or whether or not a crosswalk is present.

Furthermore, the recognition unit 101 may further recognize whether or not a moving object such as a pedestrian, a bicycle, or a motorcycle is present ahead of the vehicle 1, for example, on the basis of an image obtained by imaging a region ahead of the vehicle 1 with the use of the side camera 12 on the left when viewed on the basis of the travelling direction or the front camera 11.

Determining Unit 102

The determining unit 102 determines whether or not control for overtaking the vehicle 30 recognized by the recognition unit 101 is executed. The determining unit 102 may determine whether or not the control for overtaking the recognized vehicle 30 is executed on the basis of the map information and positional information of the vehicle 1 or the vehicle 30.

In the present embodiment, the determining unit 102 determines that the control for overtaking the vehicle 30 recognized by the recognition unit 101 is executed in a case where the distance between the vehicle 30 present in the travelling direction of the vehicle 1 and the vehicle 1 is equal to or shorter than a predetermined distance. Meanwhile, the determining unit 102 determines that the control for overtaking the vehicle 30 recognized by the recognition unit 101 is not executed in a case where the distance between the vehicle 30 present in the travelling direction of the vehicle 1 and the vehicle 1 is longer than the predetermined distance. The process for determining whether or not the control for overtaking is executed refers to a process for determining whether or not to make a decision to try to overtake the vehicle 30 before determining whether or not the vehicle 1 following the vehicle 30 can actually overtake the vehicle 30.

In a case where the vehicle 30 is still travelling (has not stopped yet), the determining unit 102 need just determine whether or not the control for overtaking the vehicle 30 is executed on the basis of a speed of the vehicle 1 and a speed of the vehicle 30 (or a speed of the vehicle 30 relative to the vehicle 1) and whether or not a distance between the vehicle 30 and the vehicle 1 is equal to or shorter than a predetermined distance. The speed or the relative speed of the vehicle 30 can be estimated from a change in position of the vehicle 30 in time-series images in a case where the sensing information is an image and can be estimated from a result of measurement of a radar in a case where the sensing information is a result of measurement of a radar.

Generating Unit 103

The generating unit 103 generates first information, i.e., travelling support information, for turning the vehicle 1 in a second direction (toward a road end) opposite to a first direction in which the vehicle 1 turns when overtaking the vehicle 30 among directions orthogonal to the travelling direction in a case where the determining unit 102 determines that the control for overtaking is executed. Note that the vehicle 1 may be moved by control other than turning. For example, the vehicle 1 may be slid.

The travelling support information is sometimes referred to as first information or second information. The travelling support information includes vehicle control information for controlling travelling of the vehicle 1. The vehicle control information may include information for instructing the vehicle 1 to turn in the second direction or may include information presented to a driver of the vehicle 1. The presented information is, for example, information for instructing the driver of the vehicle 1 to turn the vehicle 1 in the second direction.

In a case where the vehicle 1 autonomously operates, the generating unit 103 need just generate travelling support information including vehicle control information instructing the vehicle 1 to turn in the second direction. Meanwhile, in a case where the vehicle 1 is manually operated by the driver, the generating unit 103 need just generate travelling support information including presented information instructing the driver to turn the vehicle 1 in the second direction. Turning of the vehicle 1 is clockwise or counterclockwise turning when a body of the vehicle 1 is viewed from directly above (in a horizontal plane having an axis extending vertically) and is also called wheeling or yawing in a turning direction. The first direction is a direction in which the vehicle 1 moves in order to overtake the vehicle 30. For example, the first direction corresponds to a direction toward a right road end when viewed on the basis of the travelling direction of the vehicle 1 in a case of left-hand traffic and corresponds to a direction toward a left road end when viewed on the basis of the travelling direction of the vehicle 1 in a case of right-hand traffic. For example, the second direction corresponds to a direction toward a left road end when viewed on the basis of the travelling direction of the vehicle 1 in a case of left-hand traffic and corresponds to a direction toward a right end when viewed on the basis of the travelling direction of the vehicle 1 in a case of right-hand traffic. Turning the vehicle 1 in the second direction corresponds to moving the vehicle 1 to a left side of a driving lane of a road in a case of left-hand traffic and corresponds to moving the vehicle 1 to a right side of a driving lane of a road in a case of right-hand traffic.

Figure 4:
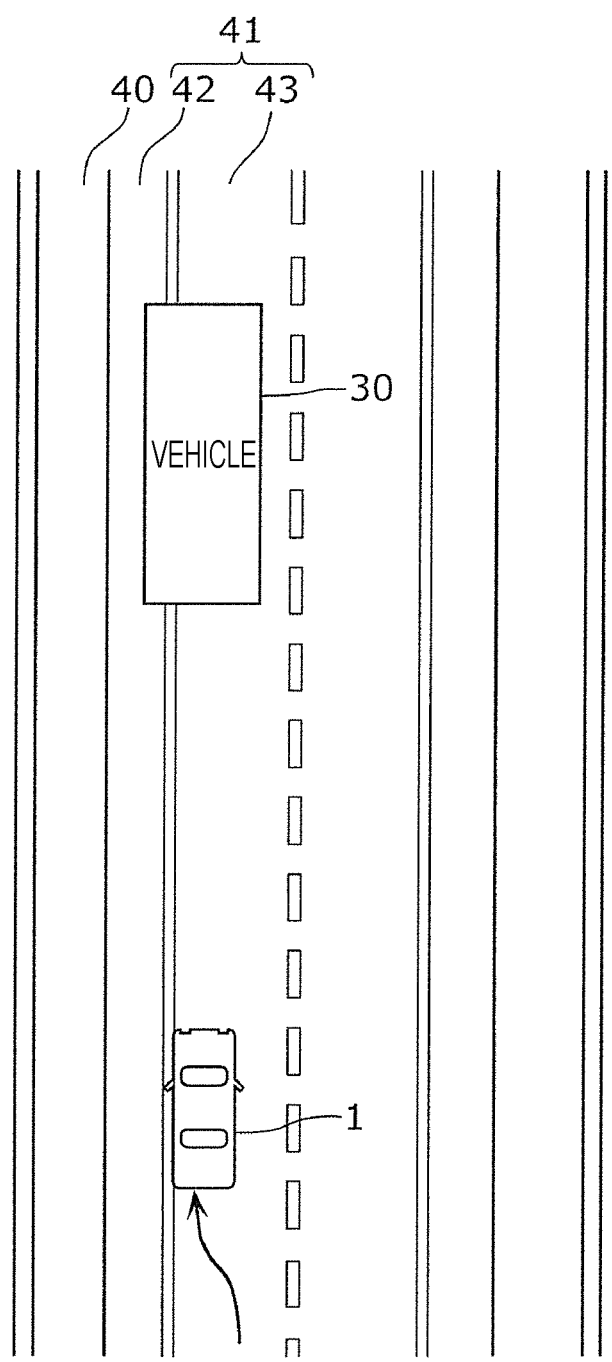
FIG. 4 illustrates turning of the host vehicle in a second direction according to Embodiment 1.

FIG. 4 illustrates turning of the vehicle 1 in the second direction according to the present embodiment. In FIG. 4, elements that are similar to those in FIG. 3 are given identical reference signs, and detailed description thereof is omitted. FIG. 4 illustrates an example in which the road 41 is left-hand traffic and the vehicle 1 turns in the second direction in accordance with the travelling support information generated by the generating unit 103.

In the present embodiment, the generating unit 103 generates travelling support information for moving the vehicle 1 to a left side of the travelling direction, for example, as illustrated in FIG. 4 in a case where the determining unit 102 determines that the control for overtaking the vehicle 30 is executed. In the example illustrated in FIG. 4, the second direction corresponds to the left side of the travelling direction, and turning the vehicle 1 in the second direction corresponds to moving the vehicle 1 to the left side on the driving lane 43 so as not to cross a white line separating the road 41 from the road shoulder 42 on the driving lane 43.

More specifically, the generating unit 103 generates travelling support information for moving the vehicle 1 to the left side of the travelling direction in a case where the distance between the vehicle 30 that is recognized by the recognition unit 101 as being present in the travelling direction of the vehicle 1 and the vehicle 1 is equal to or shorter than a second distance. Meanwhile, in a case where the distance between the vehicle 30 that is recognized by the recognition unit 101 as being present in the travelling direction of the vehicle 1 and the vehicle 1 is longer than the second distance, the generating unit 103 does not generate travelling support information for moving the vehicle 1 to the left side of the travelling direction until the distance between the vehicle 30 and the vehicle 1 becomes equal to shorter than the second distance. In a case where the distance between the vehicle 1 and the vehicle 30 which the vehicle 1 tries to overtake is long, there is a risk of failure to confirm a pedestrian and the like. However, in a case where the generating unit 103 operates as described above, the vehicle 1 is moved in the second direction after coming close to the vehicle 30 which the vehicle 1 tries to overtake, thereby allowing sensing of surroundings of the vehicle 30. This makes it possible to confirm a pedestrian and the like around the vehicle 30 with more certainty. The second distance is shorter than the predetermined distance.

In FIG. 4, in a case where the road 41 is right-hand traffic, the second direction corresponds to the right side of the travelling direction, and turning the vehicle 1 in the second direction corresponds to moving the vehicle 1 to the right side on the driving lane so as not to cross a white line separating the road from the road shoulder on the driving lane.

Output Unit 104

The output unit 104 outputs first information generated by the generating unit 103. Specifically, the output unit 104 outputs travelling support information generated by the generating unit 103.

In the present embodiment, for example, in a case where the vehicle 1 autonomously operates and where the generating unit 103 generates travelling support information including vehicle control information instructing the vehicle 1 to turn in the second direction, the output unit 104 need just supply the travelling support information to a control unit or the like that controls autonomous operation of the vehicle 1. Meanwhile, for example, in a case where the vehicle 1 is manually operated by the driver and where the generating unit 103 generates travelling support information including presented information instructing the driver to turn the vehicle 1 in the second direction, the output unit 104 need just supply this travelling support information to the presenting unit 105.

Presenting Unit 105

The presenting unit 105 presents a result of determination made by the determining unit 102. In the present embodiment, the presenting unit 105 presents information output by the output unit 104. For example, the presenting unit 105 presents, to the driver, an instruction to turn the vehicle 1 in the second direction in a case where travelling support information including presented information instructing the driver to turn the vehicle 1 in the second direction has been output by the output unit 104.

In a case where the information processing apparatus 10 does not include the presenting unit 105, the information processing apparatus 10 may include a presentation control unit that controls presentation of a result of determination made by the determining unit 102.

Operation of Information Processing Apparatus 10

Next, a processing method of the information processing apparatus 10 configured as above is described.

Figure 5:
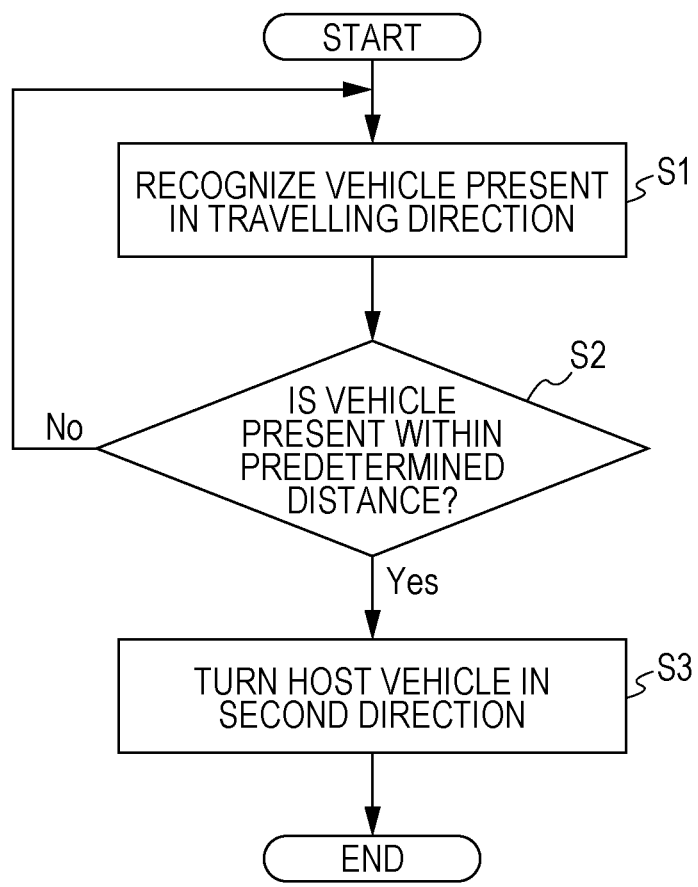
FIG. 5 is a flowchart illustrating a processing method of an overtaking determining process performed by the information processing apparatus according to Embodiment 1.

FIG. 5 is a flowchart illustrating a processing method of the process for determining whether or not to overtake performed by the information processing apparatus 10 according to Embodiment 1.

First, as illustrated in FIG. 5, the information processing apparatus 10 recognizes a vehicle that is present in a travelling direction of a host vehicle on the basis of sensing information (S1). In the present embodiment, the recognition unit 101 of the information processing apparatus 10 recognizes the vehicle 30 that is present in the travelling direction of the vehicle 1 that is a host vehicle on the basis of sensing information such as an image including the vehicle 30 or a result of measurement of a distance and a direction to the vehicle 30.

Next, the information processing apparatus 10 determines whether or not the vehicle recognized in S1 is present within a predetermined distance from the host vehicle (S2). In the present embodiment, the information processing apparatus 10 determines whether or not a distance between the vehicle 30 recognized in S1 and the vehicle 1 is equal to or shorter than a predetermined distance as a method for determining whether or not the control for overtaking the vehicle 30 recognized in S1 is executed.

In a case where the information processing apparatus 10 determines in S2 that the vehicle is present within the predetermined distance from the host vehicle (Yes in S2), the information processing apparatus 10 turns the host vehicle in the second direction (S3). In the present embodiment, in a case where the information processing apparatus 10 determines that the distance between the vehicle 30 and the vehicle 1 is equal to or shorter than the predetermined distance, the information processing apparatus 10 generates travelling support information for turning the vehicle 1 in the second direction that is opposite to the first direction in which the vehicle 1 turns when overtaking the vehicle 30 and then supplies the travelling support information to the control unit or the presenting unit 105 of the vehicle 1. In a case where the vehicle 1 autonomously operates, the control unit of the vehicle 1 can thus turn the vehicle 1 in the second direction in accordance with the travelling support information. Meanwhile, in a case where the vehicle 1 is operated by the driver, the driver can thus turn the vehicle 1 in the second direction in accordance with an instruction presented by the presenting unit 105 to turn the vehicle 1 in the second direction.

Meanwhile, in a case where the information processing apparatus 10 determines in S2 that the vehicle is not present within the predetermined distance from the host vehicle (No in S2), S1 is performed again.

Effects Etc. of Embodiment 1

Figure 6:
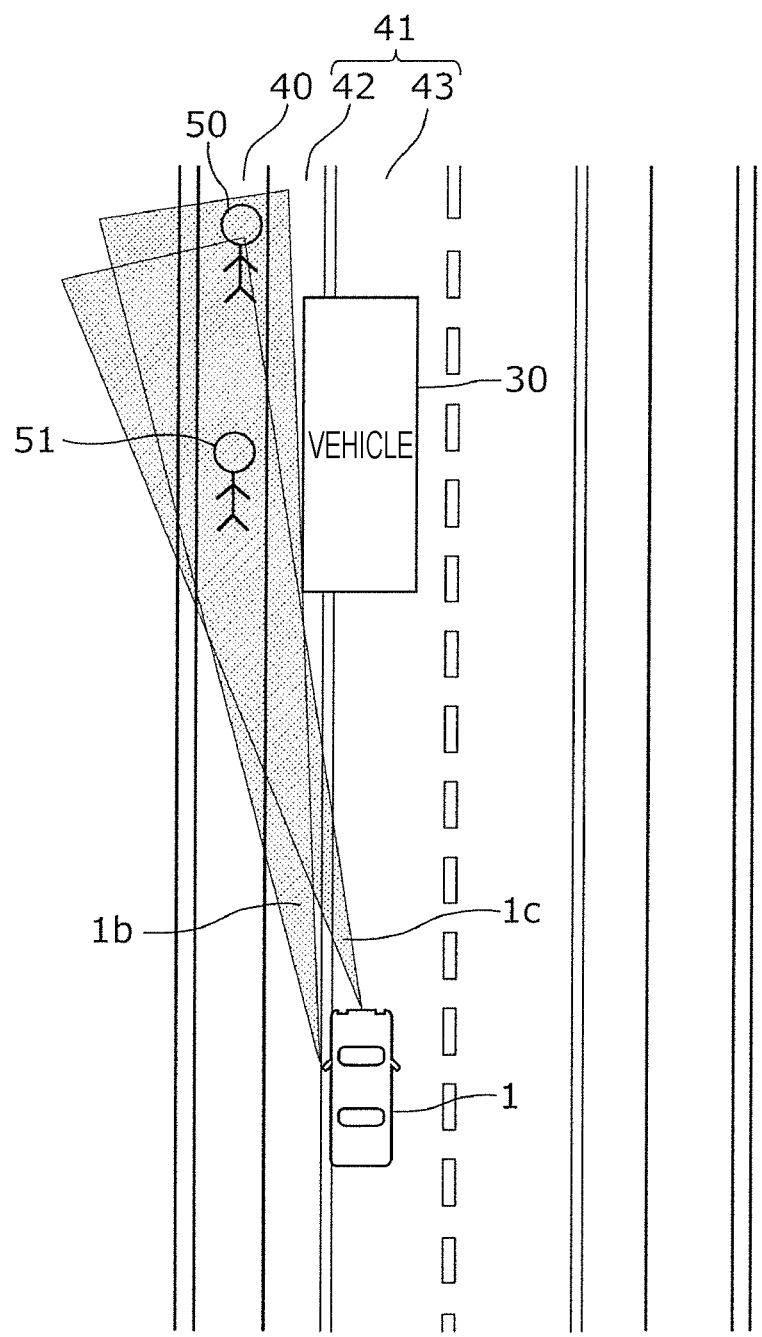
FIG. 6 is a view for explaining effects of Embodiment 1.

FIG. 6 is a view for explaining effects of Embodiment 1. In FIG. 6, elements that are similar to those in FIGS. 3 and 4 are given identical reference signs, and detailed description thereof is omitted. FIG. 6 illustrates an example in which the vehicle 1 is turned in a leftward direction (toward the left side of the travelling direction) that is the second direction in accordance with travelling support information generated by the generating unit 103. FIG. 6 illustrates a region 1b ahead of the vehicle 1 that can be imaged by the side camera 12 in a case where the vehicle 1 is turned in the second direction and a region 1c ahead of the vehicle 1 that can be imaged by the front camera 11 in a case where the vehicle 1 is turned in the second direction. In the example illustrated in FIG. 6, the vehicle 30 is a large-sized bus or the like, and a pedestrian 50 and a pedestrian 51 are present on the sidewalk 40 around the vehicle 30 that has stopped or is about to stop.

As illustrated in FIG. 6, the information processing apparatus 10 according to Embodiment 1 can recognize the pedestrians 50 and 51 present on the left of the vehicle 30 from images obtained by imaging the region 1b and the region 1c that are sensing information of the vehicle 1 by turning the vehicle 1 in the second direction. That is, the information processing apparatus 10 can recognize the pedestrians 50 and 51 present on the left of the vehicle 30 before passing a right side of the vehicle 30 in order to overtake the vehicle 30.

This allows the information processing apparatus 10 to estimate that the pedestrian 50, for example, may rush out from the front of the vehicle 30 when the vehicle 1 passes the right side of the vehicle 30 in order to overtake the vehicle 30, thereby making it possible to determine in advance whether or not it is necessary to slow down or stop the vehicle 1 when the vehicle 1 passes the right side.

This allows the information processing apparatus 10 to lessen a risk of collision, for example, with the pedestrian 50 when the vehicle 1 passes the right side of the vehicle 30 in order to overtake the vehicle 30, thereby allowing the vehicle 1 to more safely overtake the vehicle 30.

As described above, according to the information processing apparatus 10 according to Embodiment 1, it is possible to check whether or not a moving object such as a pedestrian is present ahead of a vehicle which a host vehicle following the vehicle is trying to overtake before passing beside the vehicle in order to overtake the vehicle, thereby allowing the host vehicle to more safely overtake the vehicle.

Furthermore, in a case where the information processing apparatus 10 according to Embodiment 1 includes the presentation control unit, a person on the host vehicle can be notified of movement in the second direction in advance.

Furthermore, according to the information processing apparatus 10 according to Embodiment 1, in a case where it is determined whether or not the control for overtaking is executed on the basis of map information and positional information of the host vehicle or the vehicle, the control for overtaking can be executed in a situation where a person rushes out from the front of the vehicle, and a processing load can be thus reduced.

In a case where the travelling support information includes vehicle control information for controlling travelling of the vehicle and where the host vehicle is an autonomous vehicle, the host vehicle can autonomously execute the control for overtaking. In a case where the travelling support information includes information presented to a driver of a vehicle and where the host vehicle is a manually operated vehicle, it is possible to call attention of the driver of the host vehicle.

According to the information processing apparatus 10 according to Embodiment 1, the control for overtaking can be executed in a place where a traffic rule is left-hand traffic or right-hand traffic.

Modification

Even in a case where the information processing apparatus 10 determines that the control for overtaking is executed, the information processing apparatus 10 may turn the vehicle in the second direction after checking whether or not a moving object is present in a backward direction opposite to the travelling direction and the second direction. The following describes this case as a modification. Differences from Embodiment 1 are mainly described below.

Configuration

Figure 7:
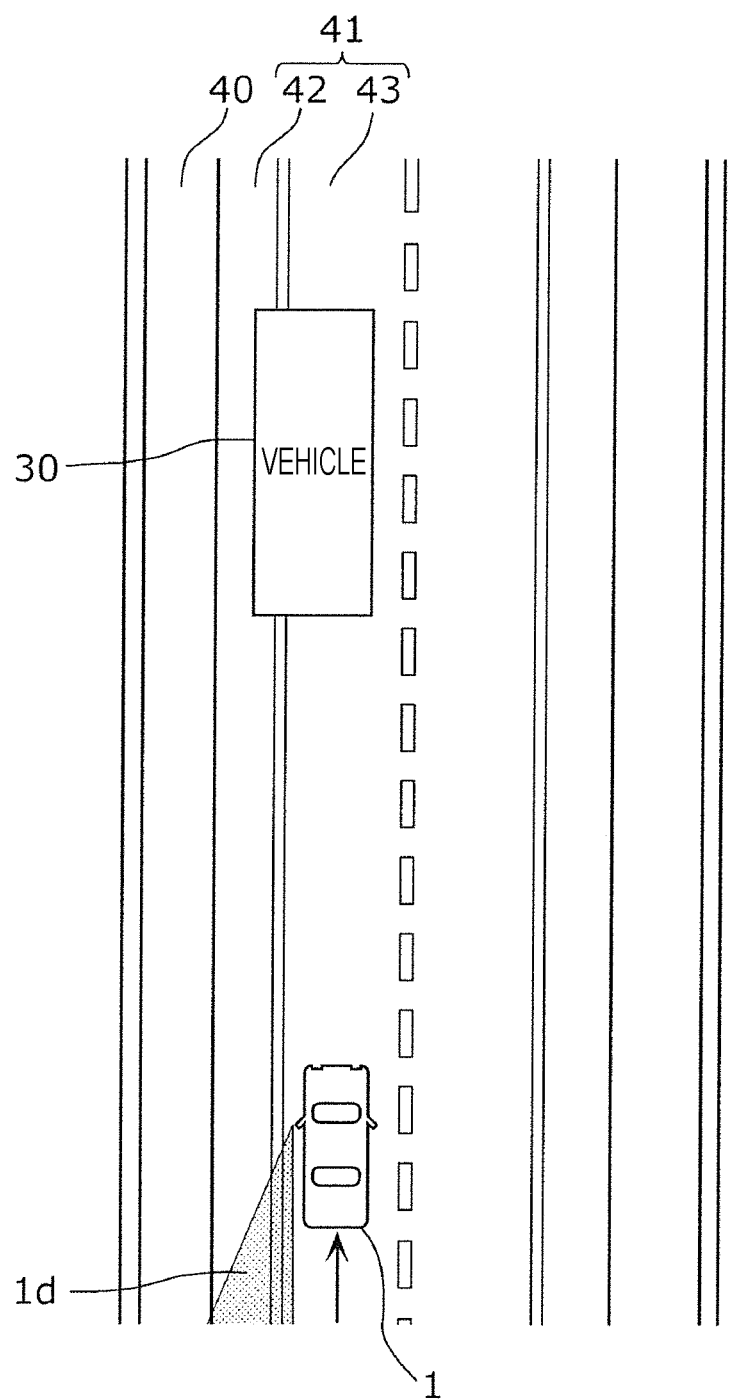
FIG. 7 illustrates sensing in a left rear region of a host vehicle according to a modification of Embodiment 1.

FIG. 7 illustrates sensing of a left rear region of the vehicle 1 according to the modification of Embodiment 1. In FIG. 7, elements that are similar to those in FIGS. 3, 4, and 6 are given identical reference signs, and detailed description thereof is omitted. FIG. 7 illustrates a left rear region 1d of the vehicle 1 that can be imaged by the side camera 12 on the left side before the vehicle 1 is turned in a leftward direction that is the second direction, i.e., toward the left side of the travelling direction.

In the present modification, the recognition unit 101 may further recognize whether or not a moving object is present in a backward direction opposite to the travelling direction of the vehicle 1 and the second direction on the basis of sensing information. The moving object is, for example, a bicycle or a motorcycle or may be a bicycle or a running person. In the example illustrated in FIG. 7, the recognition unit 101 recognizes whether or not a moving object is present in a left rear region of the vehicle 1 on the basis of sensing information of the vehicle 1 that is an image obtained by imaging the region 1d with the use of the side camera 12 (not illustrated) on the left side of the travelling direction.

In the present modification, in a case where the determining unit 102 determines that control for overtaking is executed and where no moving object is recognized in the backward direction and the second direction by the recognition unit 101, the determining unit 102 need just supply a result of the determination indicating that the control for overtaking is executed to the generating unit 103. In the example illustrated in FIG. 7, in a case where the determining unit 102 determines that control for overtaking is executed and where no moving object is recognized in a left rear region of the vehicle 1 by the recognition unit 101, the determining unit 102 need just supply a result of the determination indicating that the control for overtaking is executed to the generating unit 103.

Operation

Next, a processing method of the information processing apparatus 10 according to the present modification configured as above is described.

Figure 8:
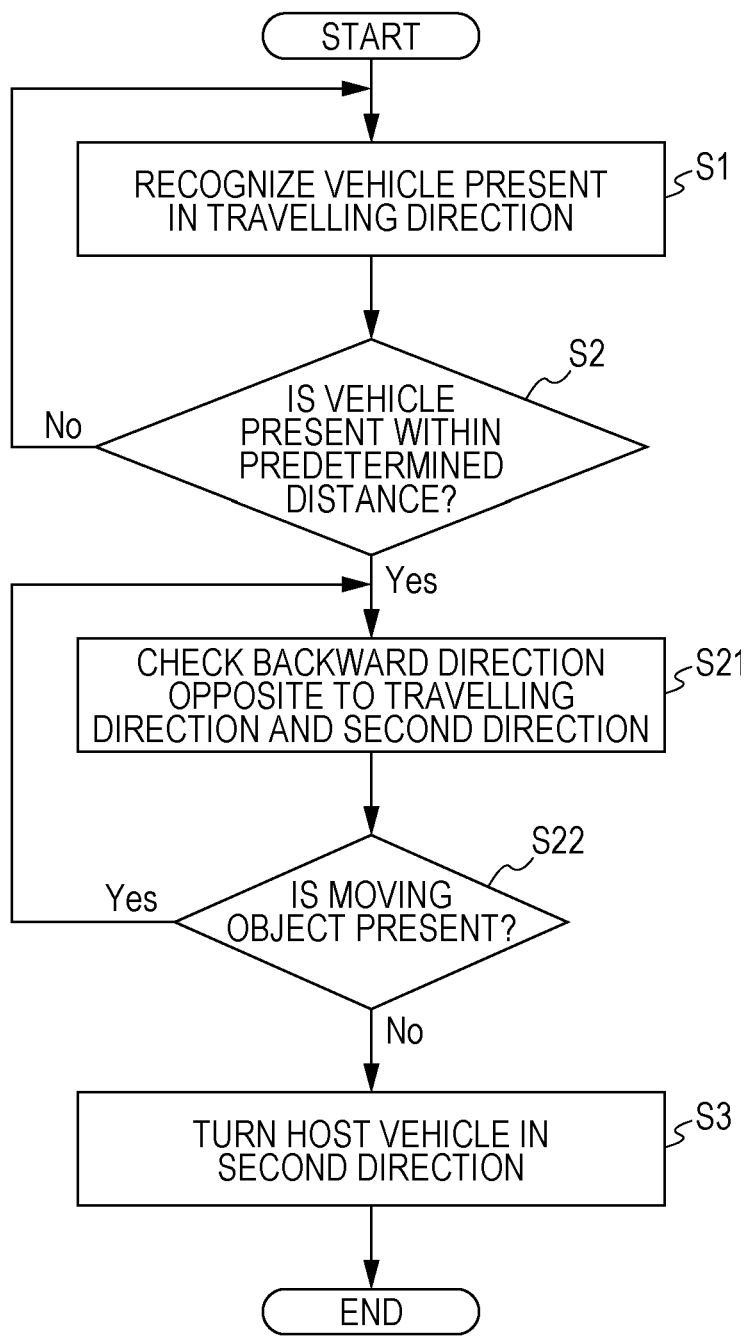
FIG. 8 is a flowchart illustrating a processing method of an overtaking determining process performed by an information processing apparatus according to the modification of Embodiment 1.

FIG. 8 is a flowchart illustrating a processing method of a process for determining whether or not to overtake performed by the information processing apparatus 10 according to the modification of Embodiment 1. In FIG. 8, elements that are similar to those in FIG. 5 are given identical reference signs, and detailed description thereof is omitted.

In a case where the information processing apparatus 10 according to the present modification determines in S2 that a vehicle is present within a predetermined distance from a host vehicle (Yes in S2), the information processing apparatus 10 checks a backward direction opposite to the travelling direction of the host vehicle and the second direction (S21). More specifically, in a case where the information processing apparatus 10 determines that a distance between the vehicle 30 and the vehicle 1 is equal to or shorter than a predetermined distance, the information processing apparatus 10 recognizes whether or not a moving object is present in a left rear region of the vehicle 1 on the basis of sensing information of the vehicle 1 that is an image obtained by imaging the left rear region 1d of the travelling vehicle 1, for example, illustrated in FIG. 7.

Next, the information processing apparatus 10 according to the present modification checks whether or not a moving object is present in the backward direction and the second direction checked in S21 (S22). More specifically, the information processing apparatus 10 checks whether or not a moving object such as a bicycle or a motorcycle is present in the left rear region 1d of the travelling vehicle 1, for example, as illustrated in FIG. 7.

In a case where the information processing apparatus 10 according to the present modification confirms in S22 that no moving object is present in the backward direction and the second direction (No in S22), the process in S3 is performed. More specifically, the information processing apparatus 10 turns the vehicle 1 in the leftward direction that is the second direction in a case where the information processing apparatus 10 confirms that no moving object such as a bicycle or a motorcycle is present in the left rear region 1d of the travelling vehicle 1, for example, as illustrated in FIG. 7. Meanwhile, in a case where the information processing apparatus 10 confirms in S22 that a moving object is present in the backward direction and the second direction (Yes in S22), S21 is performed again.

Effects Etc. of Modification

As described above, according to the information processing apparatus 10 according to the present modification, even in a case where it is determined that control for overtaking is executed, it is possible to turn the vehicle 1 in the second direction after checking whether or not a moving object is present in the backward direction opposite to the travelling direction and the second direction. This makes it possible to prevent collision with a moving object such as a motorcycle or a bicycle present in the second direction behind the vehicle 1 when the vehicle 1 is turned in the second direction.

As described above, according to the information processing apparatus 10 according to the present modification, it is possible to further improve safety since contact or collision with a moving object present in the second direction can be avoided when the host vehicle is moved in the second direction.

As described above, according to the information processing apparatus 10 according to the present modification, the host vehicle can more safely overtake a vehicle.

In the present modification, the vehicle 1 is turned in the second direction in a case where a moving object is not recognized in the backward direction and the second direction. However, the present modification is not limited to this. The vehicle 1 may be turned in the second direction in a case where a moving object is not recognized in the forward direction that is the travelling direction of the host vehicle and the second direction.

Embodiment 2

Next, an information processing apparatus 10A according to Embodiment 2 is described. Differences from Embodiment 1 are mainly described below.

Information Processing Apparatus 10A

Figure 9:
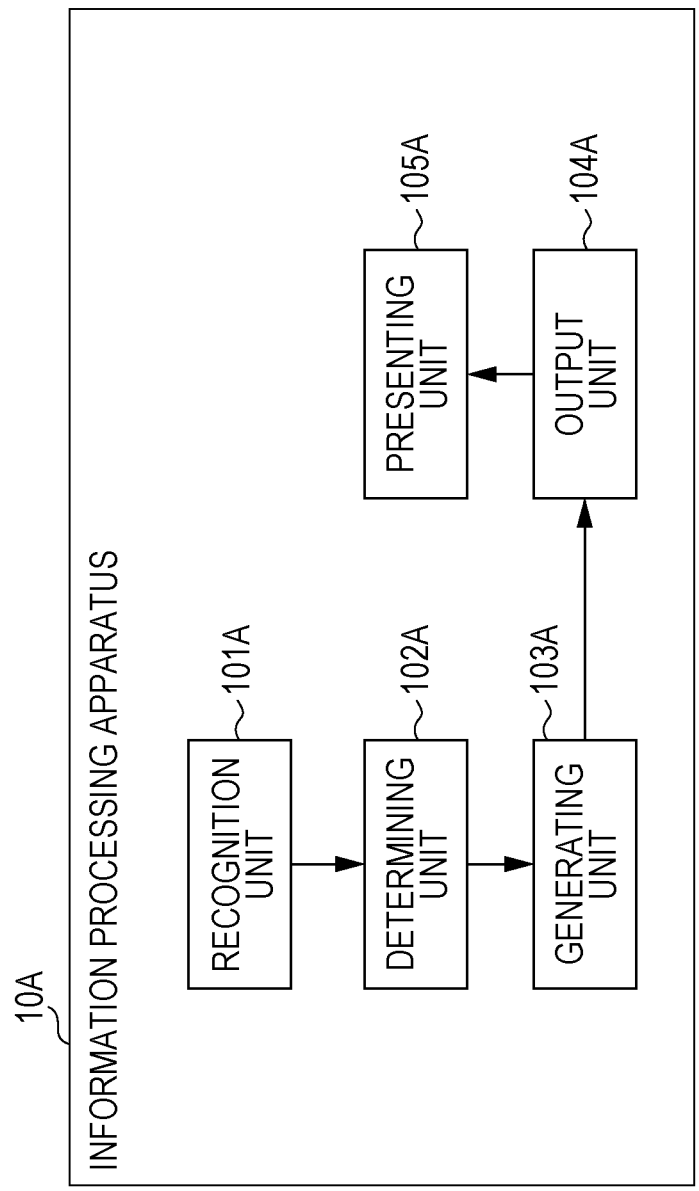
FIG. 9 illustrates an example of a configuration of an information processing apparatus according to Embodiment 2.

FIG. 9 is a diagram illustrating an example of a configuration of an information processing apparatus 10A according to Embodiment 2.

The information processing apparatus 10A is mounted on a vehicle 1, as in the case of the information processing apparatus 10 according to Embodiment 1. In the present embodiment, the information processing apparatus 10A includes a recognition unit 101A, a determining unit 102A, a generating unit 103A, an output unit 104A, and a presenting unit 105A, as illustrated in FIG. 9. The information processing apparatus 10A may be configured not to include the presenting unit 105A, as in the case of the information processing apparatus 10.

Recognition Unit 101A

The recognition unit 101A recognizes a vehicle 30 that is present in a travelling direction of the vehicle 1 on the basis of sensing information, as in the case of the recognition unit 101 according to Embodiment 1. Furthermore, the recognition unit 101A recognizes a person present in the travelling direction of the vehicle 1 on the basis of sensing information obtained after movement of the vehicle 1 in a second direction. The recognition unit 101A may recognize behavior or a state of the person on the basis of sensing information obtained after movement of the vehicle 1 in the second direction. Furthermore, the recognition unit 101A recognizes an oncoming vehicle that is present in the travelling direction of the vehicle 1 on the basis of sensing information obtained during turning of the vehicle 1 in a first direction. The sensing information obtained after movement in the second direction is sensing information obtained after turning in the second direction or during turning in the first direction, and it is assumed below that this sensing information is an image taken by a front camera 11, a side camera 12, or a rear camera 13 mounted on the vehicle 1.

In the present embodiment, the recognition unit 101A recognizes a person present around the vehicle 30 on the basis of sensing information obtained after turning of the vehicle 1 in the second direction or sensing information obtained during turning of the vehicle 1 in the first direction. The recognition unit 101A continues to recognize a positional relationship between the person and the vehicle 30 while tracking the person by continuously recognizing the person while the vehicle 1 is turning in the first direction. In a case where the side camera 12 is a fish-eye camera, the person is shown in a fish-eye image obtained by the fish-eye camera that is sensing information until the person enters a blind area created by the vehicle 30 while the vehicle 1 is turning in the first direction after turning in the second direction. Therefore, the recognition unit 101A can continuously recognize the person and a position thereof from the fish-eye image obtained by the fish-eye camera that is sensing information by using a method such as homography or a Structure From Motion. The recognition unit 101A may recognize the behavior or state of the person while tracking the person by continuously recognizing the person while the vehicle 1 is turning in the first direction.

The recognition unit 101A may switch a provider of sensing information from the front camera 11 that is capable of imaging the travelling direction of the vehicle 1 to the side camera 12 that is capable of imaging a direction that crosses the travelling direction of the vehicle 1 after output of first information, i.e., travelling support information and recognize a person present in the travelling direction on the basis of sensing information that is an image obtained by the side camera 12.

The recognition unit 101A may switch the provider of the sensing information to a bottom camera that is provided on a bottom of the vehicle. The bottom camera images a region ahead of and below the vehicle 1. This allows the bottom camera to image a leg of a person present ahead of the vehicle 30 which the vehicle 1 tries to overtake. The recognition unit 101A tracks the leg of the person in an image obtained by the bottom camera. This makes it possible to track the person even after the person enters a blind area of the front camera 11 or the side camera 12 created by the vehicle 30.

A result of recognition of a person in an image obtained by the front camera 11 or the side camera 12 and a result of recognition of a person in an image obtained by the bottom camera may be associated with each other. In this case, the leg in the image obtained by the bottom camera and the person can be associated with each other. This makes it possible to improve accuracy of recognition of the person based on the image obtained by the bottom camera. Imaging using the bottom camera may be started concurrently with imaging using the front camera 11 or the side camera 12.

Furthermore, the recognition unit 101A may recognize a vehicle (hereinafter referred to as a surrounding vehicle) such as an automobile or a motorcycle that is present around the vehicle 1 on the basis of sensing information obtained during turning of the vehicle 1 in the first direction. These processes are more specifically described below with reference to the drawings.

Figure 10:
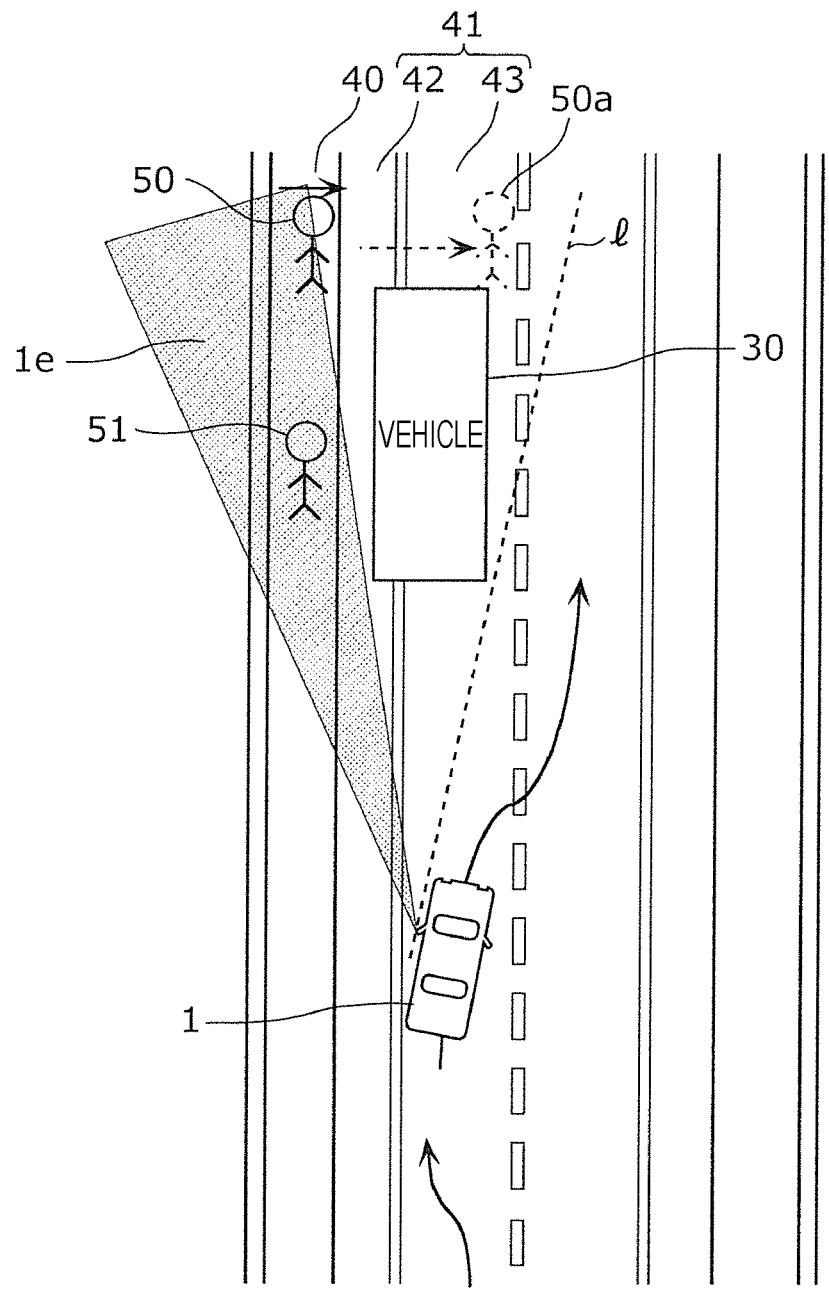
FIG. 10 illustrates sensing ahead of a host vehicle according to Embodiment 2.
Figure 11:
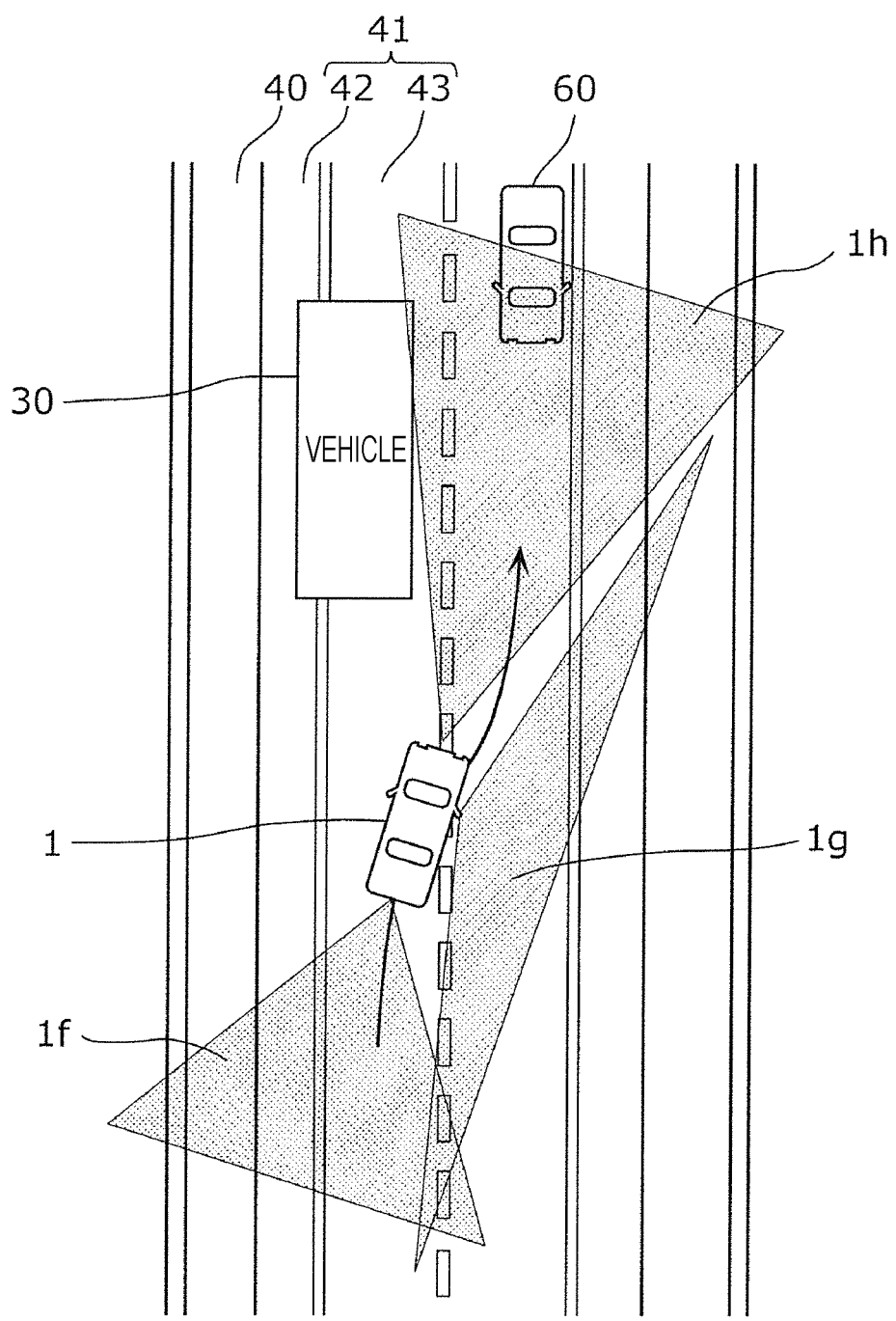
FIG. 11 illustrates sensing around the host vehicle according to Embodiment 2.

FIG. 10 illustrates sensing ahead of the vehicle 1 according to the present embodiment. FIG. 11 illustrates sensing around the vehicle 1 according to the present embodiment. In FIGS. 10 and 11, elements that are similar to those in FIGS. 3, 4, and 6 are given identical reference signs, and detailed description thereof is omitted. FIGS. 10 and 11 each illustrate an example of sensing after turning of the vehicle 1 in the second direction. FIGS. 10 and 11 illustrate an example in which the vehicle 1 is turning in the first direction in order to overtake the vehicle 30 that is stopped after turning in the second direction.

The recognition unit 101A can recognize pedestrians 50 and 51 present in the second direction relative to the vehicle 30, i.e., present on the left of the vehicle 30 on the basis of sensing information that is an image of a region 1b taken by the side camera 12 and an image of a region 1c taken by the front camera 11 when the vehicle 1 moves to a left side (or a left end) of a driving lane 43 by turning in a leftward direction that is the second direction, for example, as illustrated in FIG. 6.

The recognition unit 101A tracks the pedestrians 50 and 51 by continuously recognizing the pedestrians 50 and 51 present in the second direction relative to the vehicle 30, i.e., present on the left of the vehicle 30 on the basis of image sensing information obtained by imaging a region 1e by using the side camera 12 while the vehicle 1 is turning in the rightward direction that is the first direction. The recognition unit 101A continues to recognize positional relationships between the pedestrians 50 and 51 and the vehicle 30 or behavior or states of the persons while the vehicle 1 is turning in the rightward direction. The recognition unit 101A may switch a camera used for sensing to the side camera 12 or may use all cameras when the vehicle 1 starts turning in the rightward direction that is the first direction.

The recognition unit 101A may further recognize whether or not a person is present ahead of the vehicle 30 on the basis of sensing information that is an image of a region 1h ahead of the vehicle 1 taken by the front camera 11 in a case where the vehicle 1 turns in the rightward direction and comes close to a central line of the driving lane 43, for example, as illustrated in FIG. 11. The recognition unit 101A recognizes a surrounding vehicle around the vehicle 1 such as an oncoming vehicle 60 that is present in the travelling direction of the vehicle 1 on the basis of sensing information that is an image of the region 1h, an image of a region 1g beside the vehicle 1 taken by the side camera 12, and an image of a region 1f behind the vehicle 1 taken by the rear camera 13. The recognition unit 101A may start recognition of the surrounding vehicle before the vehicle 1 illustrated in FIG. 10 further turns in the rightward direction, travels in the travelling direction, and comes close to the central line of the driving lane 43 as illustrated in FIG. 11. The recognition unit 101A may start recognition of the surrounding vehicle from the position of the vehicle 1 illustrated in FIG. 10.

Determining Unit 102A

The determining unit 102A determines whether or not control for overtaking the vehicle 30 recognized by the recognition unit 101A is executed, as in the case of the determining unit 102 according to Embodiment 1. Details of this determining process have been described above, and therefore description thereof is omitted.

Furthermore, the determining unit 102A performs an overtaking continuation determining process (a first continuation determining process) of whether or not execution of the control for overtaking is continued on the basis of sensing information obtained after movement of the vehicle 1 in the second direction. The obtained sensing information is a result of recognition of the recognition unit 101A and is, for example, a positional relationship between a person recognized by the recognition unit 101A and the vehicle 30 or behavior or a state of the person. This sensing information may be, for example, the presence or absence of a surrounding vehicle such as an oncoming vehicle. More specifically, the determining unit 102A performs the overtaking continuation determining process (the first continuation determining process) of whether or not the control for overtaking is continued on the basis of the positional relationship between the person recognized by the recognition unit 101A and the vehicle 30. The determining unit 102A may perform the overtaking continuation determining process (the first continuation determining process) of whether or not the control for overtaking is continued on the basis of the behavior or state of the person recognized by the recognition unit 101A. The determining unit 102A may further perform an overtaking continuation determining process (a second continuation determining process) whether or not execution of the control for overtaking is continued in accordance with a result of the determination as to the presence or absence of an oncoming vehicle in the travelling direction on the basis of sensing information obtained after output of second information (i.e., travelling support information) by the output unit 104A.

In the overtaking continuation determining process (the first continuation determining process), the determining unit 102A may determine a risk level on the basis of the positional relationship between the person recognized by the recognition unit 101A and the vehicle 30 or the behavior or state of the person recognized by the recognition unit 101A.

In the present embodiment, the determining unit 102A performs the overtaking continuation determining process (the first continuation determining process) of determining whether or not the vehicle 1 can actually overtake the vehicle 30 by using a result of recognition by the recognition unit 101A. This is more specifically described below with reference to the drawings.

In the example illustrated in FIGS. 6 and 10, the determining unit 102A performs an overtaking continuation determining process on the basis of a relationship between the pedestrians 50 and 51 who have been recognized by the recognition unit 101A and is being tracked and the vehicle 30. The determining unit 102A may perform the overtaking continuation determining process by using the position of the pedestrian 50 who is being tracked or behavior or a state of the pedestrian 50 such as a body direction and a moving direction. The body direction of the pedestrian 50 in an image can be obtained by the determining unit 102A as a recognition result by machine learning of the recognition unit 101A.

More specifically, in the example illustrated in FIG. 10, the determining unit 102A determines the positional relationships between the pedestrian 50 and the vehicle 30 or the behavior or state of the pedestrian 50. This allows the determining unit 102A to predict that the pedestrian 50 present on a sidewalk 40 may move to a position of a pedestrian 50a and rush out from a front of the vehicle 30 and there is a risk of collision with the pedestrian 50 when the vehicle 1 overtakes the vehicle 30. In the example illustrated in FIG. 10, the determining unit 102A need just determine that execution of the control for overtaking is not continued since it can be predicted that there is a risk of collision with the pedestrian 50 when the vehicle 1 overtakes the vehicle 30.

In the example illustrated in FIG. 11, assume that the determining unit 102A determines that a person recognized by the recognition unit 101A is present ahead of the vehicle 30 on the basis of sensing information that is an image of the region 1h ahead of the vehicle 1. In this case, the determining unit 102A need just determine that execution of the control for overtaking is not continued since it can be predicted that there is a risk of collision with the person when the vehicle 1 overtakes the vehicle 30.

In the overtaking continuation determining process, the determining unit 102A may predict a risk of collision with a pedestrian recognized by the recognition unit 101A when the vehicle 1 overtakes the vehicle 30 on the basis of the pedestrian and determine a risk level in accordance with the predicted risk. More specifically, the determining unit 102A need just determine that the control for overtaking is not continued in a case where the risk level determined on the basis of the pedestrian recognized by the recognition unit 101A is a risk level 3. Meanwhile, the determining unit 102A need just determine that the control for overtaking is continued in a case where the risk level determined on the basis of the pedestrian recognized by the recognition unit 101A is a risk level 1 or 2.

An example of a risk level is described with reference to FIG. 10. That is, for example, the determining unit 102A may predict that there is a risk of collision with the pedestrian 50 in a case where the vehicle 1 overtakes the vehicle 30 and determine that the risk level is the risk level 2 in a case where the determining unit 102A determines that the pedestrian 50 is trying to cross ahead of the vehicle 30 on the basis of the positional relationship between the pedestrian 50 and the vehicle 30. Furthermore, for example, the determining unit 102A may predict that there is a risk of collision with the pedestrian 50 in a case where the vehicle 1 overtakes the vehicle 30 but the risk is low and determine that the risk level is the risk level 1 in a case where the determining unit 102A determines that the pedestrian 51 gets off the vehicle 30 that is stopped on the basis of the positional relationship between the pedestrian 51 and the vehicle 30.

For example, the determining unit 102A may predict that there is a risk of collision with a pedestrian in a case where the vehicle 1 overtakes the vehicle 30 and determine that the risk level is the risk level 2 in a case where the determining unit 102A determines that the body of the pedestrian faces the driving lane 43 ahead of the vehicle 30 on the basis of the positional relationship between the pedestrian and the vehicle 30. Furthermore, for example, the determining unit 102A may predict that there is a high risk of collision with a pedestrian in a case where the vehicle 1 overtakes the vehicle 30 and determine that the risk level is the risk level 3 in a case where the determining unit 102A determines that the pedestrian has started crossing ahead of the vehicle 30 or has been hidden by the vehicle 30 after crossing ahead of the vehicle 30 on the basis of the positional relationship between the pedestrian and the vehicle 30.

Furthermore, the determining unit 102A may perform an overtaking continuation determining process on the basis of the presence or absence of an oncoming vehicle in the travelling direction based on a surrounding vehicle recognized by the recognition unit 101A during turning of the vehicle 1 in the first direction. In the example illustrated in FIG. 11, the determining unit 102A determines that the control for overtaking is not continued since a surrounding vehicle recognized by the recognition unit 101A includes an oncoming vehicle 60 present in the travelling direction and it can be predicted that there is a risk of collision with the oncoming vehicle 60 in a case where the vehicle 1 overtakes the vehicle 30.

Generating Unit 103A

The generating unit 103A generates first information, i.e., travelling support information, for turning the vehicle 1 in the second direction in a case where the determining unit 102A determines that the control for overtaking is executed. Details of this generating process have been described above, and therefore description thereof is omitted.

Furthermore, the generating unit 103A generates second information, i.e., travelling support information, for overtaking the vehicle 30 in a case where the determining unit 102A determines in the overtaking continuation determining process (the first continuation determining process) that execution of the control for overtaking is continued. The generating unit 103A may determine how the vehicle 1 behaves when overtaking the vehicle 30 in accordance with behavior or a state of a person recognized by the recognition unit 101A and generate second information for overtaking the vehicle 30 on the basis of the determined behavior of the vehicle 1 in a case where the determining unit 102A determines in the overtaking continuation determining process (the first continuation determining process) that the control for overtaking is continued. The behavior of the vehicle 1 includes a vehicle speed or a travelling route.

Specifically, the generating unit 103A generates travelling support information for turning the vehicle 1 in the first direction in a case where the determining unit 102A determines that execution of the control for overtaking is continued. For example, the generating unit 103A need just generate travelling support information including vehicle control information instructing the vehicle 1 to turn in the first direction in a case where the vehicle 1 autonomously operates. Meanwhile, the generating unit 103A need just generate travelling support information including presented information instructing a driver to turn the vehicle 1 in the first direction in a case where the vehicle 1 is manually operated by the driver.

The generating unit 103A may determine behavior of the vehicle 1 in accordance with behavior or a state of a person recognized by the recognition unit 101A and generate travelling support information for causing the vehicle 1 to do the behavior in a case where the determining unit 102A determines that execution of the control for overtaking is continued. The generating unit 103A may generate travelling support information for controlling the vehicle 1 in accordance with a risk level determined by the determining unit 102A.

In the present embodiment, for example, the generating unit 103A generates travelling support information for causing the vehicle 1 to turn in the rightward direction that is the first direction toward the central line of the driving lane 43 as illustrated in FIGS. 10 and 11 after the vehicle 1 moves to the left side (or the left end) of the driving lane 43 by turning in the leftward direction that is the second direction as illustrated in FIG. 6. The generating unit 103A may generate travelling support information for turning the vehicle 1 in the second direction and then causing the vehicle 1 to travel on a travelling route for turning the vehicle 1 in the rightward direction that is the first direction in a case where the determining unit 102A determines that the control for overtaking is executed.

The generating unit 103A may generate travelling support information for causing the vehicle 1 to turn in the rightward direction that is the first direction while travelling slowly at a predetermined speed so as to travel toward the central line of the driving lane 43, for example, in a case where the determining unit 102A determines that the risk level is the risk level 1. The generating unit 103A may generate travelling support information for causing the vehicle 1 to turn in the rightward direction that is the first direction so as to travel toward the central line of the driving lane 43 so that the travelling support information includes presented information for alerting the driver to a possibility that a pedestrian may appear from the front of the vehicle 30 in a case where the determining unit 102A determines that the risk level is the risk level 1.

The generating unit 103A may generate travelling support information for causing the vehicle 1 to turn in the rightward direction that is the first direction while travelling more slowly than the predetermined speed so as to travel toward the central line of the driving lane 43, for example, in a case where the determining unit 102A determines that the risk level is the risk level 2. The generating unit 103A may generate travelling support information for stopping the vehicle 1 without turning the vehicle 1 in the rightward direction that is the first direction, for example, in a case where the determining unit 102A determines that the risk level is the risk level 3.

The generating unit 103A need just generate travelling support information for causing the vehicle 1 to overtake the vehicle 30 in a case where the determining unit 102A determines that control for causing the vehicle 1 to actually overtake the vehicle 30 is executed. In the example illustrated in FIG. 11, the generating unit 103A need just generate travelling support information for causing the vehicle 1 to turn in the rightward direction, travel in the travelling direction beyond the central line of the driving lane 43 (travel along a path indicated by the arrow in FIG. 11), and overtake the vehicle 30 in a case where the determining unit 102A determines that control for overtaking is executed.

Output Unit 104A

The output unit 104A outputs first information or second information generated by the generating unit 103A. Specifically, the output unit 104A outputs travelling support information generated by the generating unit 103A.

In the present embodiment, for example, in a case where the vehicle 1 autonomously operates and the generating unit 103 generates travelling support information including vehicle control information instructing the vehicle 1 to turn in the first direction or to stop the vehicle 1, the output unit 104A supplies this travelling support information to a control unit or the like that controls autonomous operation of the vehicle 1. Meanwhile, for example, in a case where the vehicle 1 is manually operated by the driver and where the generating unit 103A generates travelling support information including presented information instructing the driver to turn the vehicle 1 in the first direction or stop the vehicle 1, the output unit 104A supplies this travelling support information to the presenting unit 105A.

Presenting Unit 105A

The presenting unit 105A presents information output by the output unit 104A. For example, the presenting unit 105 presents an instruction instructing the driver to turn the vehicle 1 in the first direction or stop the vehicle 1 in a case where the output unit 104A outputs travelling support information including presented information instructing the driver to turn the vehicle 1 in the first direction or stop the vehicle 1.

Operation of Information Processing Apparatus 10A

Next, a processing method of the information processing apparatus 10A configured as above is described.

Figure 12:
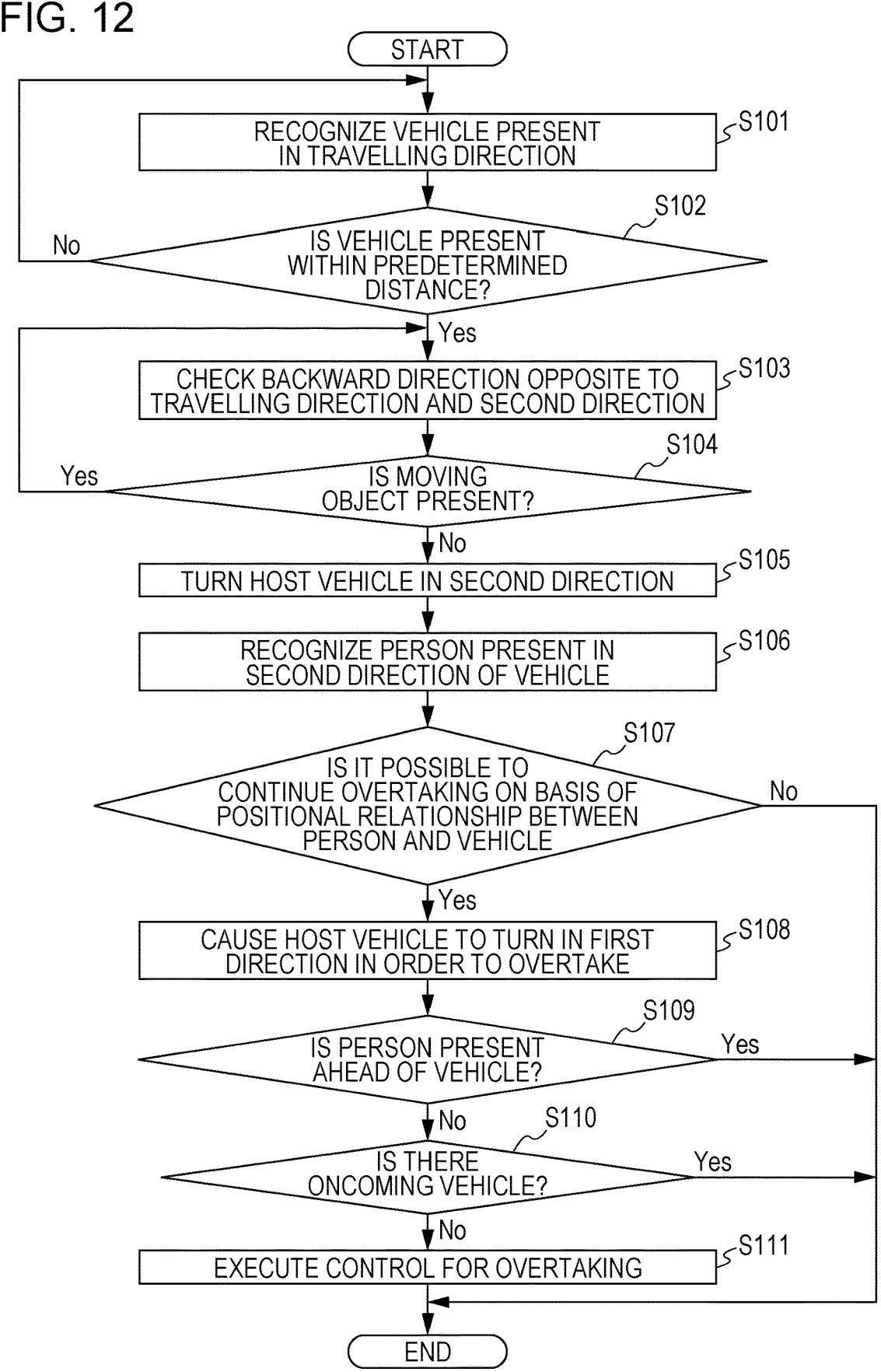
FIG. 12 is a flowchart illustrating a processing method of an overtaking determining process performed by the information processing apparatus according to Embodiment 2.

FIG. 12 is a flowchart illustrating a processing method of an overtaking determining process performed by the information processing apparatus 10A according to Embodiment 2. Steps S101 through S105 illustrated in FIG. 12 are identical to S1 through S3 illustrated in FIG. 8, and therefore description thereof is omitted.

Next to the process in S105, the information processing apparatus 10A recognizes a person that is present in the second direction relative to a vehicle on the basis of sensing information as illustrated in FIG. 12 (S105). In the present embodiment, the information processing apparatus 10A recognizes a person present on the left of the vehicle 30, i.e., in the second direction relative to the vehicle 30 on the basis of at least sensing information that is an image obtained by the front camera 11 of the vehicle 1 that is a host vehicle.

Next, the information processing apparatus 10A determines whether or not it is possible to continue overtaking on the basis of a positional relationship between the person recognized in S106 and the vehicle recognized in S101 (S107). In the present embodiment, the information processing apparatus 10A predicts whether or not there is a risk of collision with the person in a case where the vehicle 1 overtakes the vehicle 30, for example, on the basis of the positional relationship between the person recognized in S106 and the vehicle recognized in S101 and determines whether or not it is possible to continue overtaking on the basis of the prediction.

In a case where the information processing apparatus 10A predicts that there is a high risk of collision with the person and determines that it is impossible to continue overtaking in S107 (No in S107), this processing is finished.

Meanwhile, in a case where the information processing apparatus 10A predicts that there is a low risk of collision with the person and determines that it is possible to continue overtaking in S107 (Yes in S107), the information processing apparatus 10A causes the host vehicle to turn in the first direction in order to overtake the vehicle (S108). In the present embodiment, in a case where the information processing apparatus 10A determines that it is possible to continue overtaking, the information processing apparatus 10A generate and output travelling support information for causing the vehicle 1 to turn in the rightward direction that is the first direction in order to overtake. This makes it possible to turn the vehicle 1 in the rightward direction.

Next, the information processing apparatus 10A determines whether or not a person is present ahead of the vehicle (S109). In the present embodiment, the information processing apparatus 10A determines whether or not a person is present ahead of the vehicle 30 on the basis of sensing information that is output from a sensing device such as the front camera 11 of the vehicle 1.

In a case where the information processing apparatus 10A determines in S109 that a person is present ahead of the vehicle (Yes in S109), this processing is finished. In the present embodiment, in a case where the information processing apparatus 10A determines that a person is present ahead of the vehicle 30 on the basis of the sensing information, the information processing apparatus 10A can predict that there is a risk of collision with the person when the vehicle 1 overtakes the vehicle 30, and therefore determines that it is impossible to continue overtaking, finishes this processing, and stops or slows down the vehicle 1.

Meanwhile, in a case where the information processing apparatus 10A determines in S109 that a person is not present ahead of the vehicle (No in S109), the information processing apparatus 10A further determines whether or not an oncoming vehicle is present (S110). In the present embodiment, in a case where the information processing apparatus 10A determines that a person is not present ahead of the vehicle 30 on the basis of the sensing information, the information processing apparatus 10A further determines whether or not the oncoming vehicle 60 is present on the basis of the sensing information that is output from the sensing device such as the front camera 11 of the vehicle 1.

In a case where the information processing apparatus 10A determines in S110 that no oncoming vehicle is present (No in S110), the information processing apparatus 10A executes control for overtaking. In the present embodiment, in a case where the information processing apparatus 10A confirms that no oncoming vehicle 60 is present, the information processing apparatus 10A generates and output travelling support information for causing the vehicle 1 to overtake the vehicle 30. This allows the information processing apparatus 10A to execute control for causing the vehicle 1 to actually overtake the vehicle 30.

Meanwhile, in a case where the information processing apparatus 10A determines in S110 that an oncoming vehicle is present (Yes in S110), this processing is finished. In the present embodiment, in a case where the information processing apparatus 10A confirms that the oncoming vehicle 60 is present, the information processing apparatus 10A determines that it is impossible to continue overtaking because the oncoming vehicle 60 hinders the vehicle 1 from overtaking the vehicle 30, and therefore finishes this processing and stops or slows down the vehicle 1.

Effects Etc. of Embodiment 2

Figure 13A:
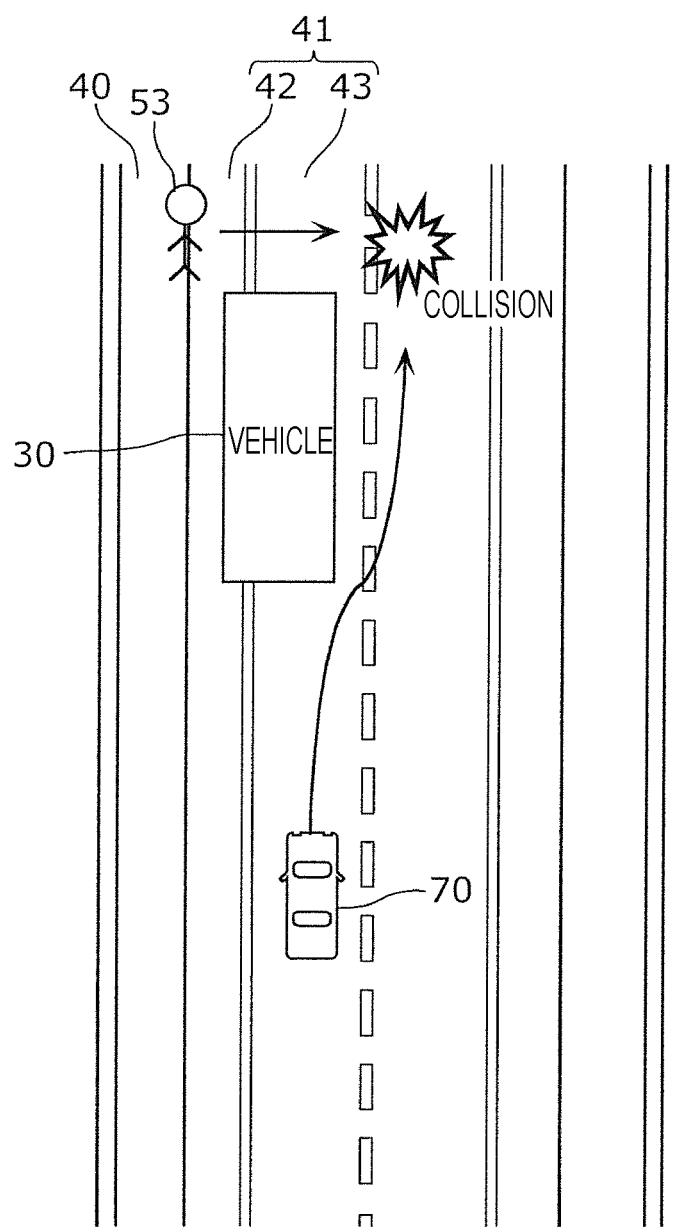
FIG. 13A is a view for explaining effects of Embodiment 2.
Figure 13B:
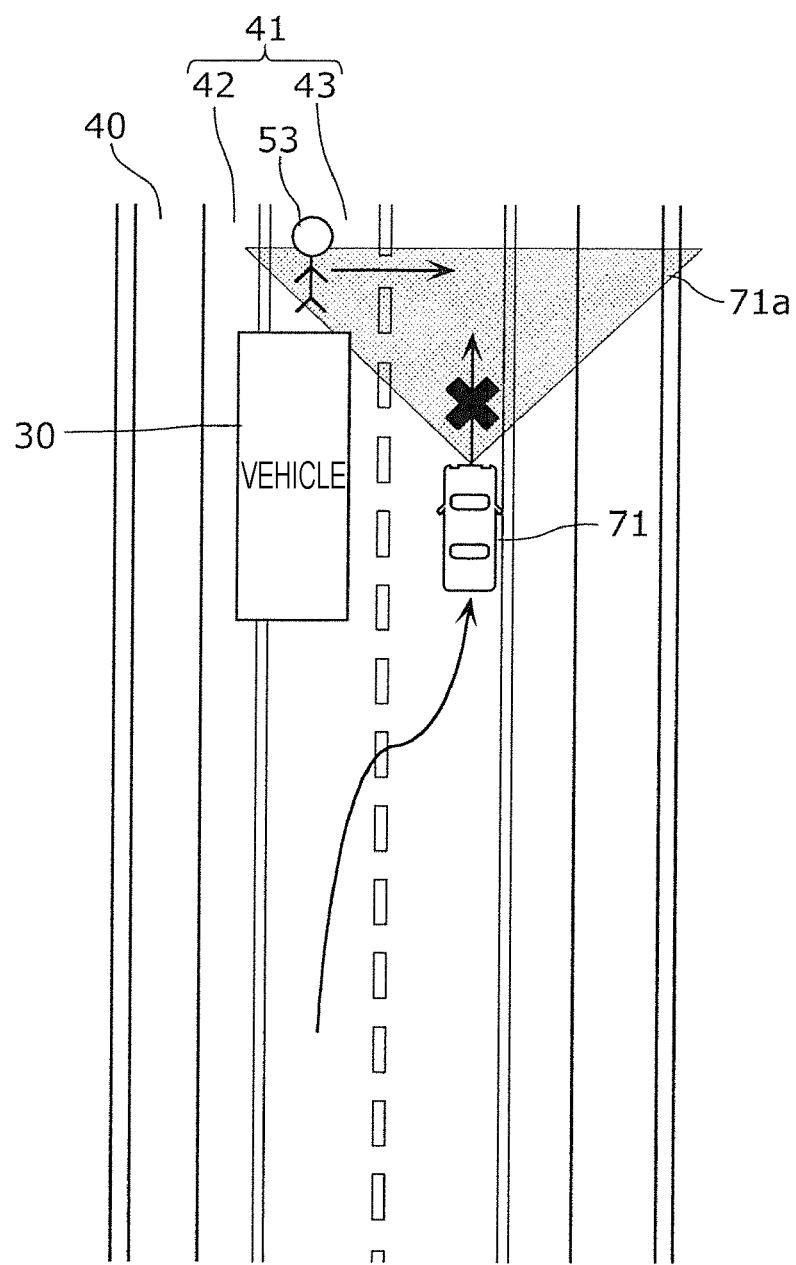
FIG. 13B is a view for explaining effects of Embodiment 2.
Figure 13C:
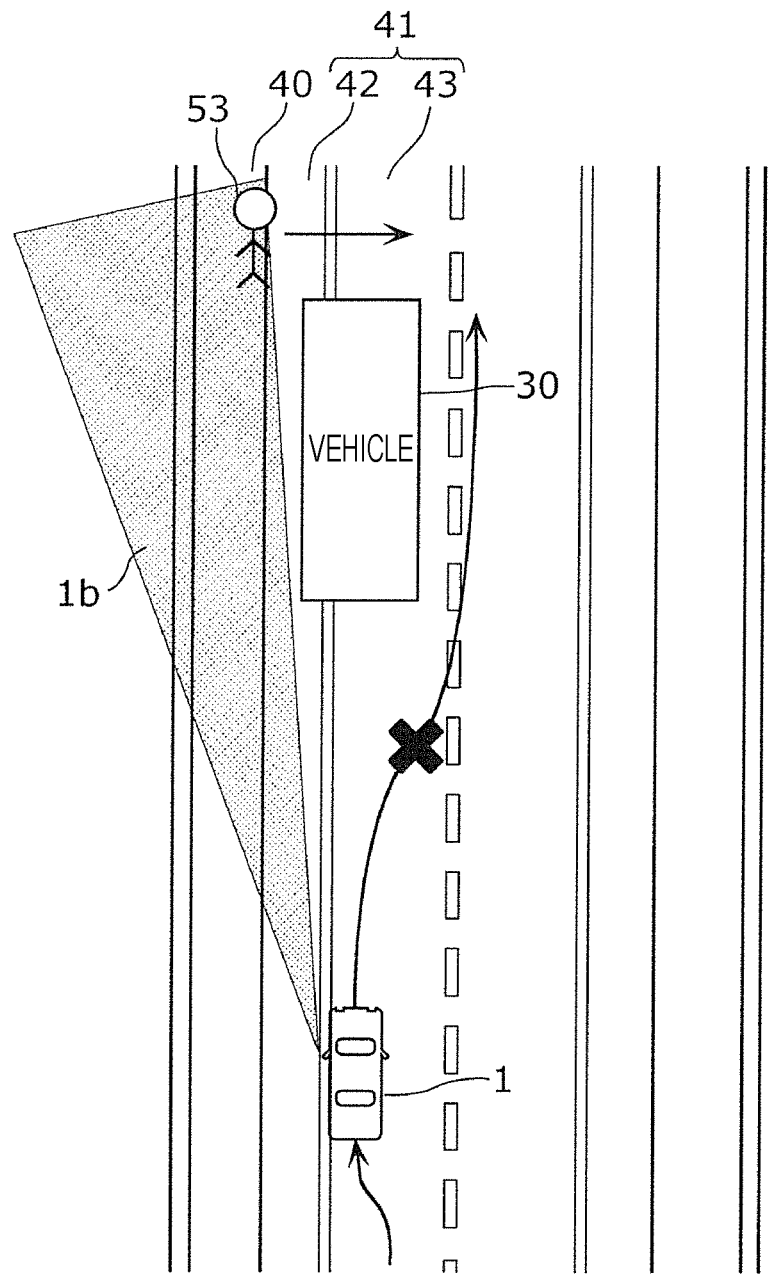
FIG. 13C is a view for explaining effects of Embodiment 2.

FIGS. 13A through 13C are views for explaining effects of Embodiment 2. FIGS. 13A and 13B illustrate a case where control for overtaking according to a comparative example is executed, and FIG. 13C illustrates a case where control for overtaking according to the present embodiment 2 is executed. In FIGS. 13A through 13C, elements that are similar to those in FIGS. 3, 4, etc. are given identical reference signs, and detailed description thereof is omitted. A vehicle 70 and a vehicle 71 are vehicles according to the comparative example and correspond to the vehicle 1 according to the present embodiment 1, but the information processing apparatus 10A according to the present embodiment is not mounted on the vehicle 70 and the vehicle 71. Assume that the travelling support apparatus disclosed in Japanese Unexamined Patent Application Publication No. 2011-108016 is mounted on the vehicle 71.

FIGS. 13A through 13C illustrate an example in which the vehicle 30 that has a larger size than the vehicle 70 or 71 or the vehicle 1 is stopped and a pedestrian 53 moving ahead of the vehicle 30 is present when the vehicle 70 or 71 or the vehicle 1 overtakes the vehicle 30.

As illustrated in FIG. 13A, when the vehicle 70 simply overtakes the vehicle 30, the vehicle 30 creates a blind area, thereby making it impossible to find the pedestrian 53 moving ahead of the vehicle 30. Therefore, there is a high possibility of collision with the pedestrian 53 when the vehicle 1 simply overtakes the vehicle 30. Meanwhile, as illustrated in FIG. 13B, the vehicle 71 moves toward an opposite lane (to a right side of a driving lane 43 in FIG. 13B) when the vehicle 71 overtakes the vehicle 30. This secures a field of view indicated by a region 71a ahead of the vehicle 71. However, in the comparative example illustrated in FIG. 13B, it is necessary to find the pedestrian 53 while the vehicle 71 is actually overtaking the vehicle 30. That is, it is necessary to promptly make a decision to cancel overtaking, for example, stop the vehicle 71, for example, at a point P1. If the decision to stop the vehicle 71, for example, at the point P1 is delayed, there is a possibility of collision with the pedestrian 53 depending on a braking distance of the vehicle 71.

Meanwhile, in the present embodiment, the vehicle 1 is moved to the left side of the driving lane 43 before the vehicle 1 actually overtakes the vehicle 30, and as a result, the vehicle 1 can secure a field of vision indicated by a region 1b ahead of the vehicle 1, as illustrated in FIG. 13C. This allows the vehicle 1 to detect a pedestrian and determine whether or not the pedestrian crosses ahead of the vehicle 30 on the basis of sensing information that is an image of the region 1b ahead of the vehicle 1, thereby making it possible to make a decision to stop the vehicle 1, for example at a point P2. In this way, the information processing apparatus 10A according to the present embodiment makes it possible to make decision to cancel overtaking earlier than the comparative examples illustrated in FIGS. 13A and 13B. This lessens a risk of collision with the pedestrian 53, thereby allowing the vehicle 1 to more safely overtake the vehicle 30.

As described above, according to the information processing apparatus 10A according to Embodiment 2, it is possible to check whether or not a moving object such as a pedestrian is present ahead of a vehicle which a host vehicle following the vehicle is trying to overtake before passing beside the vehicle in order to overtake the vehicle, thereby allowing the host vehicle to more safely overtake the vehicle.

Furthermore, according to the information processing apparatus 10A according to Embodiment 2, it is possible to cancel overtaking of the host vehicle before overtaking on the basis of a moving object present ahead of the vehicle which the host vehicle tries to overtake, thereby further improving safety.

More specifically, according to the information processing apparatus 10A according to Embodiment 2, it is possible to determine a possibility of rush-out of a recognized person onto an overtaking lane on the basis of a positional relationship between the recognized person and the vehicle, thereby achieving both safety and travelling efficiency during overtaking.

Furthermore, according to the information processing apparatus 10A according to Embodiment 2, it is possible to more accurately determine a possibility of rush-out of the person onto the overtaking lane, thereby further improving safety.

Furthermore, according to the information processing apparatus 10A according to Embodiment 2, it is possible to determine the way of overtaking in accordance with behavior or a state of the person, thereby achieving both safety and travelling efficiency during overtaking.

Furthermore, according to the information processing apparatus 10A according to Embodiment 2, it is possible to determine a degree to which the host vehicle slows down or makes a detour in accordance with the behavior or state of the person, thereby further improving safety.

Furthermore, according to the information processing apparatus 10A according to Embodiment 2, the host vehicle can overtake the vehicle by considering not only rush-out of a moving object, but also the presence or absence of an oncoming vehicle, thereby further improving safety of overtaking.

Furthermore, according to the information processing apparatus 10A according to Embodiment 2, it is possible to recognize a person that is present around a second vehicle with more certainty, thereby further improving safety of overtaking.

Furthermore, according to the information processing apparatus 10A according to Embodiment 2, in a case where a fish-eye camera is used as a side-view camera, it is possible to expand a recognition range as compared with a typical camera.

Another Embodiment

Although an example in which the vehicle 30 is trying to stop or is stopped has been described in Embodiment 1 and Embodiment 2, Embodiment 1 and Embodiment 2 are not limited to this. The vehicle 30 may be travelling.

Figure 14:
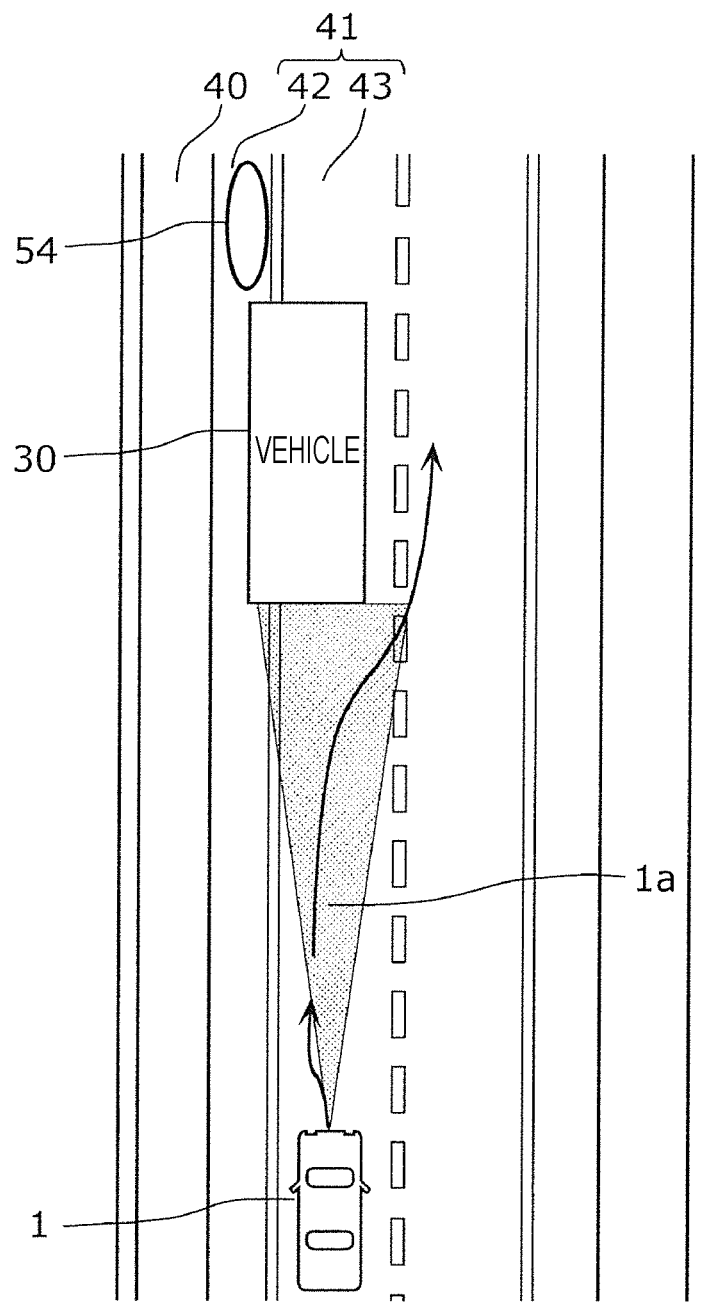
FIG. 14 illustrates an example of sensing ahead of a host vehicle according to another embodiment.

FIG. 14 illustrates an example of sensing ahead of a vehicle 1 according to another embodiment. In FIG. 14, elements that are similar to those in FIG. 3 are given identical reference signs, and detailed description thereof is omitted. FIG. 14 illustrates an example where a motorcycle 54 is present ahead of the vehicle 30 that is travelling.

In the present embodiment, the same as Embodiment 1 and Embodiment 2 applies in a case where the pedestrians 50 and 51 in Embodiment 1 and Embodiment 2 are replaced with the motorcycle 54. That is, it is possible to detect the motorcycle 54 and determine whether or not the motorcycle 54 crosses ahead of the vehicle 30 on the basis of sensing information that is an image of a region 1b ahead of the vehicle 1 by causing the vehicle 1 to move to a left side of a driving lane 43 before actually overtaking the travelling vehicle 30 along a path (travelling route) indicated by the arrow in FIG. 14.

By thus causing the vehicle 1 to move to the left side of the driving lane 43 before actually overtaking the vehicle 30 that is travelling, an information processing apparatus according to the present embodiment can make a decision to cancel overtaking well in advance. This lessens a risk of collision with the motorcycle 54, thereby allowing the vehicle 1 to more safely overtake the vehicle 30.

An information processing apparatus and the like according to the present disclosure have been described above on the basis of the embodiments, but the present disclosure is not limited to these embodiments. Various modifications of the embodiments and combinations of constituent elements in different embodiments may be also encompassed within the scope of one or more aspects without departing from the scope of the present disclosure. For example, the following cases are also encompassed within the present disclosure.

(1) Each of the apparatuses described above is a computer system that includes a microprocessor, a ROM, a RAM, a hard disk unit, a display unit, a keyboard, a mouse, and the like. A computer program is stored in the RAM or the hard disk unit. The microprocessor operates in accordance with the computer program, and thus each of the apparatuses accomplishes a function thereof. The computer program is a combination of a plurality of command codes indicating a command given to a computer for accomplishment of a predetermined function.

(2) Part of or all of constituent elements that constitute each of the apparatuses may include a single system large scale integration (LSI). The system LSI is a super-multifunction LSI produced by integrating a plurality of constituents on a single chip and is specifically a computer system including a microprocessor, a ROM, a RAM, and the like. A computer program is stored in the RAM. The microprocessor operates in accordance with the computer program, and thus the system LSI accomplishes a function thereof.

(3) Part of or all of constituent elements that constitute each of the apparatuses may include an IC card that can be detachably attached to the apparatus or a stand-alone module. The IC card or the module is a computer system that includes a microprocessor, a ROM, a RAM, and the like. The IC card or the module may include the super-multifunction LSI. The microprocessor operates in accordance with a computer program, and thus the IC card or the module accomplishes a function thereof. The IC card or the module may have tamper resistance.

(4) An aspect of the present disclosure may be the methods described above. An aspect of the present disclosure may be a computer program for causing a computer to realize these methods or may be a digital signal represented by the computer program.

(5) An aspect of the present disclosure may be a computer-readable recording medium, such as a flexible disc, a hard disk, a CD-ROM, an MO, a DVD, a DVD-ROM, a DVD-RAM, a BD (Blu-ray (Registered Trademark) Disc), or a semiconductor memory, on which the computer program or the digital signal is recorded. An aspect of the present disclosure may be the digital signal recorded on such a recording medium.

(6) An aspect of the present disclosure may be the computer program or the digital signal transmitted over an electric communication line, a wireless or wired communication line, a network represented by the Internet, data broadcasting, or the like.

(7) An aspect of the present disclosure may be a computer system including a microprocessor and a memory, the memory storing the computer program, and the microprocessor operating in accordance with the computer program.

(8) The program or the digital signal may be executed by another independent computer system by transporting the program or the digital signal on the recording medium or transporting the program or the digital signal over the network or the like.

(9) Although an example in which the information processing apparatus 10 that copes with right-hand traffic or left-hand traffic has been described in the above embodiment, the information processing apparatus 10 according to the present embodiment is not limited to this. Specifically, the information processing apparatus 10 may acquire a traffic rule of a place where the vehicle 1 is travelling and determine the first direction and the second direction on the basis of the acquired traffic rule. For example, the information processing apparatus 10 further includes a positional information acquisition unit and a communication unit. The positional information acquisition unit acquires positional information (e.g., GPS information) of the vehicle 1. The communication unit acquires a traffic rule in a place specified from the positional information of the vehicle 1 from an external apparatus (e.g., a server) by communication. Then, the generating unit 103 determines the first direction and the second direction on the basis of the acquired traffic rule and generates travelling support information.

(10) In a case where the vehicle 1 autonomously operates, the output unit 104 or the output unit 104A need just supplies travelling support information including vehicle control information for controlling the vehicle 1 to a control unit or the like that controls autonomous operation of the vehicle 1 as described above. An example of the control unit is described below.

The control unit is provided, for example, in the vehicle 1 and controls a steering wheel driving unit (not illustrated) that drives a steering wheel (not illustrated) of the vehicle 1, a brake driving unit (not illustrated) that drives a brake pedal (not illustrated), and an accelerator driving unit (not illustrated) that drives an accelerator pedal (not illustrated). For example, the steering wheel driving unit gives power in a direction in which the steering wheel is turned. For example, the brake driving unit gives power to the brake pedal of the vehicle 1. For example, the accelerator driving unit gives power to the accelerator pedal of the vehicle 1. For example, each of the steering wheel driving unit, the brake driving unit, and the accelerator driving unit may be constituted by using an actuator.

For example, in a case where the vehicle 1 autonomously operates, the control unit may control operation of the vehicle 1 by controlling the steering wheel driving unit, the brake driving unit, or the accelerator driving unit of the vehicle 1 in accordance with an instruction indicated by vehicle control information of the travelling support information. Thus, the vehicle 1 autonomously operates. Furthermore, the control unit may control a blinker (not illustrated) or a brake light (not illustrated) of the vehicle 1. Alternatively, the output unit 104 or the output unit 104A may control on/off of the blinker or the brake light of the vehicle 1 in accordance with the received travelling support information.

For example, the control unit may include a memory in which a program for accomplishing the function of the control unit and a processor and cause the processor to execute the program or may be constituted by using an integrated circuit for accomplishing the function of the control unit.

The following describes an operation of the control unit in a case where vehicle control information included in the received travelling support information includes an instruction to turn the vehicle 1 in the first direction or the second direction during autonomous operation of the vehicle 1. In this case, the control unit controls a direction and an angle of turn of the steering wheel by controlling the steering wheel driving unit in accordance with the instruction to turn the vehicle 1 included in the vehicle control information. This causes the vehicle 1 to turn in the first direction or the second direction in accordance with the direction or angle of turn of the steering wheel. In this way, the vehicle 1 autonomously turns in the first direction or the second direction. Furthermore, the control unit may control a blinker corresponding to a direction of the turn as needed.

The following describes an operation of the control unit in a case where vehicle control information included in the received travelling support information includes an instruction to slow down or stop the vehicle 1 during autonomous operation of the vehicle 1. In this case, the control unit controls magnitude of force applied to the brake pedal by controlling the brake driving unit in accordance with the instruction to slow down or stop the vehicle 1 included in the vehicle control information. This slows down or stop the vehicle 1 in accordance with the magnitude of the force applied to the brake pedal. In this way, the vehicle 1 can autonomously slow down or stop. Furthermore, the control unit may control the blinker to turn on as needed.

The following describes an operation of the control unit, for example, in a case where vehicle control information included in the travelling support information received by the control unit includes an instruction to accelerate the vehicle 1 during autonomous operation of the vehicle 1. In this case, the control unit controls magnitude of force applied to the accelerator pedal by controlling the accelerator driving unit in accordance with an instruction to accelerate the vehicle 1 included in the vehicle control information. This accelerates the vehicle 1 in accordance with the magnitude of the force applied to the accelerator pedal. In this way, the vehicle 1 can be autonomously accelerated.

The vehicle control information may include two or more instructions. In this case, the control unit controls the steering wheel driving unit, the brake driving unit, or the accelerator driving unit of the vehicle 1 in accordance with the two or more instructions included in the vehicle control information. For example, the following describes an operation of the control unit in a case where the vehicle control information included in the received travelling support information includes an instruction to turn the vehicle 1 in the first direction and an instruction to slowly move the vehicle 1 at a speed slower than a predetermined speed during autonomous operation of the vehicle 1. In this case, the control unit turns the vehicle 1 in the first direction by controlling the steering wheel driving unit in accordance with the instruction to turn the vehicle 1 included in the vehicle control information and slows down the vehicle 1 to the speed slower than the predetermined speed by controlling the brake driving unit of the vehicle 1 in accordance with the instruction to slowly move the vehicle 1 included in the vehicle control information. In this way, the vehicle 1 can autonomously turn in the first direction while moving at the speed slower than the predetermined speed.

The control unit may receive information on a speed of the vehicle 1 from a speedometer (not illustrated) of the vehicle 1. In this way, the control unit can more accurately determine whether or not the speed of the vehicle 1 is slower than the predetermined speed.

An information processing apparatus according to the present disclosure is applicable to a configuration of an ECU mounted on a vehicle that autonomously operates or a vehicle that is manually operated.

What is claimed is:

1. An information processing apparatus mounted on a first vehicle, comprising:
a processor; and
a memory that stores a program,
wherein the program causes the processor to function as
a recognizer that recognizes a second vehicle that is present in a travelling direction of the first vehicle on a basis of sensing information obtained from an image of an outside of the first vehicle, wherein the image is captured by a camera attached to an outside of the first vehicle;
a determiner that determines whether or not control for overtaking the recognized second vehicle is executed;
a generator that generates first information for moving the first vehicle in a second direction toward a second road end in a case where the determiner determines that the control for overtaking is executed, the second road end being opposite to a first road end toward which a first direction is directed, and the first direction being a direction in which the first vehicle moves in order to overtake the second vehicle; and
an outputter that outputs the generated first information.

2. The information processing apparatus according to claim 1, wherein
the determiner further performs a first continuation determining process for determining whether or not execution of the control for overtaking is continued on a basis of sensing information obtained after a movement of the first vehicle in the second direction;
the generator further generates second information for overtaking the second vehicle in a case where the determiner determines in the first continuation determining process that execution of the control for overtaking is continued; and
the outputter further outputs the generated second information.

3. The information processing apparatus according to claim 2, wherein
the recognizer further recognizes a person that is present in the travelling direction on a basis of new sensing information obtained from a new image of the outside of the first vehicle, wherein the new image is newly captured by the camera after the movement; and
the determiner performs the first continuation determining process on a basis of a positional relationship between the recognized person and the second vehicle.

4. The information processing apparatus according to claim 3, wherein
the recognizer further recognizes behavior or a state of the recognized person; and the determiner further performs the first continuation determining process on a basis of the behavior or the state of the recognized person.

5. The information processing apparatus according to claim 4, wherein
the generator determines how the first vehicle behaves when overtaking the second vehicle in accordance with the behavior or the state of the recognized person when it is determined in the first continuation determining process that the control for overtaking is continued,
wherein information for overtaking the second vehicle on a basis of the determined behavior of the first vehicle is generated as the second information.

6. The information processing apparatus according to claim 5, wherein the behavior of the first vehicle includes a vehicle speed or a travelling route.

7. The information processing apparatus according to claim 3, further comprises the camera,
wherein the camera includes
a front-view camera that images the travelling direction; and
a side-view camera that images a direction that crosses the travelling direction,
wherein the sensing information includes, as the image, an image captured by a the front-view camera; and
the recognizer further switches the front-view camera to the side-view camera after the first information is output and recognizes a person present in the travelling direction on a basis of the new sensing information that is an image, as the new image, captured obtained by the side-view camera after the first information is output.

8. The information processing apparatus according to claim 7, wherein the side-view camera is a fish-eye camera.

9. The information processing apparatus according to claim 2, wherein
the determiner further determines presence or absence of an oncoming vehicle in the travelling direction on a basis of new sensing information obtained from a new image of the outside of the first vehicle, wherein the new image is newly captured by the camera after the second information is output, performs a second continuation determining process for determining whether or not execution of the control for overtaking is continued in accordance with a result of the determination as to the presence or absence of the oncoming vehicle.

10. The information processing apparatus according to claim 2, wherein the first information and the second information include vehicle control information for controlling travelling of the first vehicle.

11. The information processing apparatus according to claim 2, wherein the first information and the second information include information presented to a driver of the first vehicle.

12. The information processing apparatus according to claim 1, wherein
the recognizer further recognizes a moving object in the second direction on a basis of the sensing information;
the determiner further determines whether or not the moving object has been recognized by the recognizer in a case where the determiner determines that the control for overtaking is executed; and
generator generates the first information in a case where the moving object has not been recognized.

13. The information processing apparatus according to claim 1, wherein the program further causes the processor to function as a presentation controller that controls presentation of a result of the determination made by the determiner.

14. The information processing apparatus according to claim 1, wherein the determiner determines whether or not the control for overtaking is executed on a basis of map information and positional information of the first vehicle or the second vehicle.

15. The information processing apparatus according to claim 1, wherein
the first direction is a direction toward a right road end when viewed on a basis of the travelling direction of the first vehicle; and
the second direction is a direction toward a left road end when viewed on a basis of the travelling direction of the first vehicle.

16. The information processing apparatus according to claim 1, wherein
- the first direction is a direction toward a left road end when viewed on a basis of the travelling direction of the first vehicle; and
- the second direction is a direction toward a right road end when viewed on a basis of the travelling direction of the first vehicle.

17. The information processing apparatus according to claim 1,
- wherein the program further causes the processor to function as an acquirer that acquires a traffic rule in a place where the first vehicle is travelling, and
- wherein the generator determines the first direction and the second direction on a basis of the acquired traffic rule.

18. A non-transitory computer-readable recording medium storing a program for causing a computer to:
- recognize a second vehicle that is present in a travelling direction of a first vehicle on a basis of sensing information that includes an image of an outside of the first vehicle, wherein the image is captured by a camera attached to an outside of the a first vehicle;
- determine whether or not control for overtaking the recognized second vehicle is executed;
- generate first information for moving the first vehicle in a second direction toward a second road end in a case where the determiner determines that the control for overtaking is executed, the second road end being opposite to a first road end toward which a first direction is directed, and the first direction being a direction in which the first vehicle moves in order to overtake the second vehicle; and
- output the generated first information.

* * * * *